United States Patent [19]

Carlson et al.

[11] Patent Number: 4,742,485

[45] Date of Patent: May 3, 1988

[54] WORD PROCESSOR WITH TYPE THROUGH MODE

[75] Inventors: Vincent Carlson, Lexington; Michael N. Fenlon, Newton; Robert P. Mansur, Chelmsford; Ronald H. Kadomiya, Cambridge, all of Mass.

[73] Assignee: Minolta Camera Kabushiki Kaisha, Osaka, Japan

[21] Appl. No.: 628,733

[22] Filed: Jul. 9, 1984

[51] Int. Cl.[4] .............................................. G06F 15/20
[52] U.S. Cl. ..................................... 364/900; 400/63; 400/70; 400/83
[58] Field of Search ... 364/200 MS File, 900 MS File; 400/63, 70, 83, 110

[56] References Cited

U.S. PATENT DOCUMENTS

| | | | |
|---|---|---|---|
| 3,780,846 | 12/1973 | Kolpek et al. | 197/19 |
| 4,223,393 | 9/1980 | Abe et al. | 364/900 |
| 4,403,301 | 9/1983 | Fessel | 364/900 |
| 4,491,933 | 1/1985 | Ursin et al. | 364/900 |
| 4,497,021 | 1/1985 | Fukuda et al. | 364/200 |
| 4,527,250 | 7/1985 | Galdun et al. | 364/900 |
| 4,607,347 | 8/1986 | Kummer et al. | 364/900 |
| 4,620,808 | 11/1986 | Kurtin et al. | 400/83 |

*Primary Examiner*—Archie E. Williams, Jr.
*Assistant Examiner*—Michael J. Ure
*Attorney, Agent, or Firm*—Price, Gess & Ubell

[57] ABSTRACT

A word processor includes a keyboard, a cathode-ray tube, a first and a second storage devices, a central processing unit, and an internal storage. The first storage device stores information about the image displayed on the CRT. A floppy disk in which a program for a personal computer is stored can be installed in the second storage device. When the power supply of the word processor is put to work, the CPU ascertains whether such a floppy disk is installed in the second storage device. If installed, the CPU causes the present system to operate as an ordinary word processor. If not installed, the CPU allows the printer to operate in quick response to the input from the keyboard in accordance with the program stored in the ROM of the internal storage device.

4 Claims, 30 Drawing Sheets

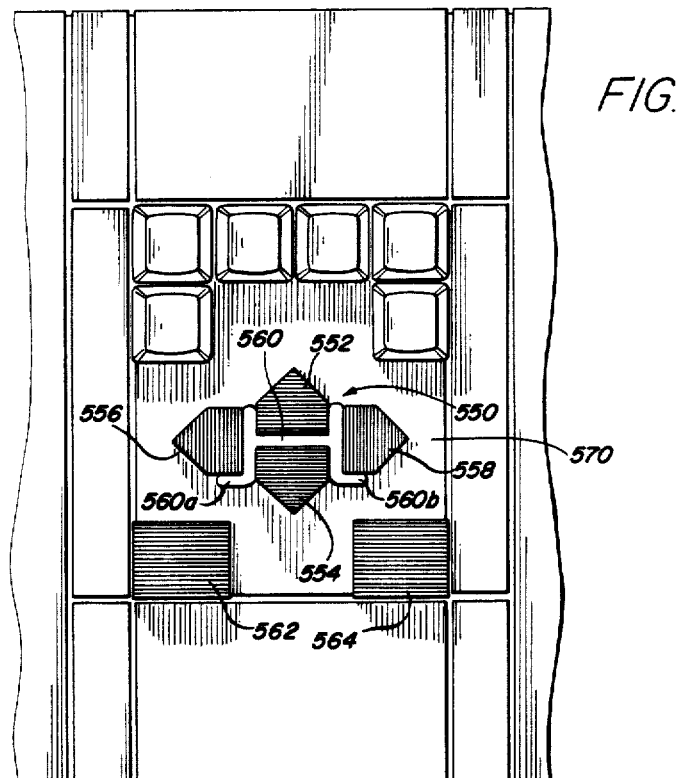
FIG. 3
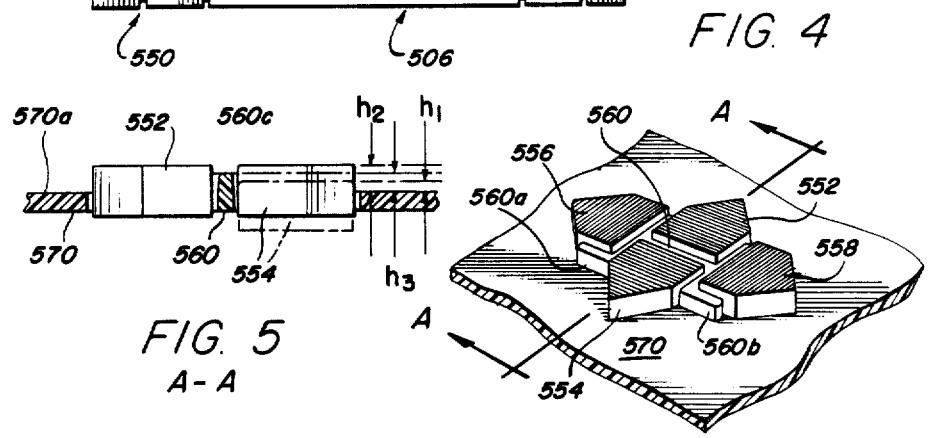
FIG. 4
FIG. 5
A-A

WORD PROCESSOR WITH TYPE THROUGH MODE

BACKGROUND OF THE INVENTION

1. Field of the Invention

The present invention relates to a word processor system which is equipped with a keyboard, a display device for displaying a full or partial page of text such as a cathode-ray tube, a storage device, a printer, and other components allow text editing on the screen of the display device, storage of the information about the text editing in the storage device, and operation of the printer according to the stored information for preparing a typewritten document.

2. Description of the Prior Art

In recent years, word processors have rapidly developed as a device that plays a central role in modern offices. Word processors which are relatively sophisticated and equipped with a full page display device have been provided for text editing of docments, thereby enabling the human operator, viewing the screen of the display, to carry out text editing operations. Accordingly, word processors of this type are the easiest to use, and have been widely employed in offices or similar environments which need to handle a large volume of information about documents.

These relatively sophisticated devices, however, have some disadvantages. First, even after the power supply is put to work, an actual operation such as text editing or printing cannot be initiated until some predetermined operations such as selection of mode, setting of file name, and determination of format are performed. Secondly, since these word processors are so designed that a printing operation is effected based on the information stored in the storage device, or for other reason, they are not convenient to produce typewritten document hurriedly. Also, these devices are rather inconvenient for those unaccustomed to them to typewrite. In reality, in case where typewritten document must be hurriedly produced, typists tend to use an ordinary typewriter or an electronic typewriter equipped with a small capacity of memory rather than a relatively sophisticated word processor as described above.

For these reasons, or because a word processor having a page display is considerably expensive, the aforementioned ordinary typewriters and electronic typewriters are still in great demand in offices where a large volume of information regarding document is handled. At present, therefore, the relatively sophisticated word processors are not yet extensively used in this field.

SUMMARY OF THE INVENTION

It is a main object of the present invention to provide a word processor which can operate in type through mode where the printer is allowed to print characters in quick response to the input from the keyboard when a storage medium storing a given program for word processing is not installed in the processor.

It is another object of the invention to provide a word processor which is controlled in the aforementioned type through mode in the case where the above-described storage medium is installed in the processor but the given program cannot be called up.

It is a further object of the invention to provide a word processor where the contents which were entered by means of the keyboard in the type through mode are stored in a storage device in accordance with another mode, hereinafter referred to as "word processing mode", that obeys the given program described above.

It is an additional object of the invention to provide a word processor where the contents which were entered by means of the keyboard in the type through mode are displayed on the screen of the display device.

It is a yet further object of the invention to provide a word processor where when the cursor is moved on the screen of the display device in the type through mode, either the position of the paper or the position of the print head or both are controlled corresponding to the position of the cursor.

Specifically, a main object of the invention is achieved by a word processor which comprises: a display device for displaying a full or partial page of image information to be printed, such as characters; a keyboard for entering the information to be displayed as characters on the display device; a first storage device for storing the information that is displayed as an image on the display device; a printer that performs its printing operation according to the information stored in the storage device; a second storage device in which a storage medium storing a certain program for word processing can be detachably installed; and a control unit for controlling the external devices including the display device, the keyboard, and the printer according to said program; the word processor being characterized in that it further includes a discriminating means for ascertaining whether the storage medium is installed in the second storage device when the power supply of the processor is put to work, and a mode control means for selecting the mode in which the input from the keyboard is processed to allow the printer to perform its printing operation in quick response to the input from the keyboard after the absence of the storage medium is established by the discriminating means.

Another object of the invention is achieved by the aforementioned word processor where the control unit further includes a second discriminating means for ascertaining that the certain program cannot be called up when the power supply is put to work and a storage medium is installed, the mode control means acting to select the mode in which the signal involved in application of data from the keyboard is processed to allow the printer to perform its printing operation in quick response to the input from the keyboard after the inability to call up the program is established by the second discriminating means.

A further object of the invention is achieved by the aforementioned word processor which is so designed that when a storage medium is installed in the second storage device while the processor is being controlled in the type through mode that permits the printing operation of the printer in quick response to the input from the keyboard, the contents entered from the keyboard in the type through mode are stored in the second device according to a word processing mode that obeys a certain program stored in the storage medium.

An additional object of the present invention is achieved by the aforementioned word processor in which the control unit is so designed as to control the display device in connection with the input from the keyboard when the keyboard is operated in the type through mode that allows the printing operation of the printer in quick response to the input from the keyboard, for providing a display on the screen of the display device corresponding to the printing operation of the printer.

A yet further object of the invention is achieved by the word processor last mentioned in which the control unit is so designed as to control either the position of the paper or the position of the print head or both in connection with the position of the cursor on the screen of the display device when an operation is performed to move the cursor in the type through mode.

BRIEF DESCRIPTION OF THE DRAWINGS

FIG. 4 is a perspective view of the cursor keys and the partition wall shown in FIG. 3;

FIG. 5 is a cross-sectional view taken along line A—A of FIG. 4;

FIGS. 6-10, 11(a)-11(c), 12 and 13 are flowcharts showing various sequences of steps which are performed in the body of the word processor shown in FIG. 1 for controlling purposes;

DETAILED DESCRIPTION OF THE INVENTION

[Structure of the System and Summary of the Operation]

Figure 1:
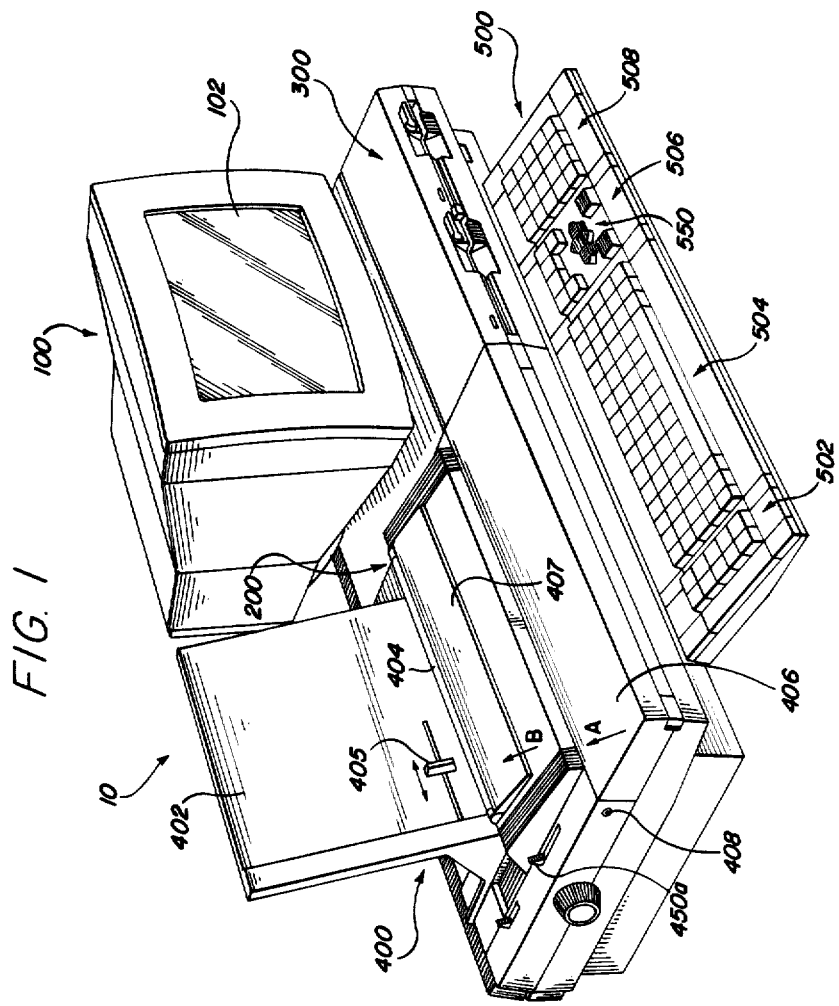
FIG. 1 is a perspective view of a word processor according to the present invention.

Referring first to FIG. 1, there is shown a word processor 10 embodying the concept of the present invention. The processor includes a display device 100 mounted on the body 200 of the processor. The display device consists of a twelve-inch cathode ray tube, for example, which has a display screen 102 capable of displaying 80 characters/line × 25 lines whose direction can be controlled by rotating them in any desired direction. A storage device 300 consisting of a floppy disk driver is mounted in the front portion of the housing of the word processor, the housing being integral with the body 200. A floppy disk (not shown) is received in the storage device 300. A printer 400 has a paper guide 402 along which paper (not shown) is inserted and a platen 404 around which the inserted paper is wound by the rotation of the platen for setting the paper. The printer 400 is an ordinary impact printer using a daisy wheel except that sensors associated with control are provided. The structure of the printer 400 will be described in detail later.

The word processor further includes a keyboard 500 comprising 99 keys, in this specific example, which are laid out substantially according to their functions. The keyboard is composed of auxiliary keys 502, alphanumeric keys 504, a function key section 506, and calculational keys 508 containing operational keys. The auxiliary keys 502 are used to allow the word processor 10 to function even when a floppy disk storing a program for a personal computer is installed in the floppy disk driver 300. The function key section 506 contains function keys and cursor-moving keys 550 which are used during a word processing operation. The structure and function of the cursor-moving keys 550 will be described later.

In the structure described thus far, the CRT 100, the floppy disk driver 300, the printer 400, and the keyboard 500 are electrically connected to the body 200 of the processor, and they might be collectively called the external equipment. It is possible that all or some of them are appropriately combined into a singles unit. This term comes from the fact that they are external to the control unit in the body of the system shown in FIG. 2.

Figure 2:
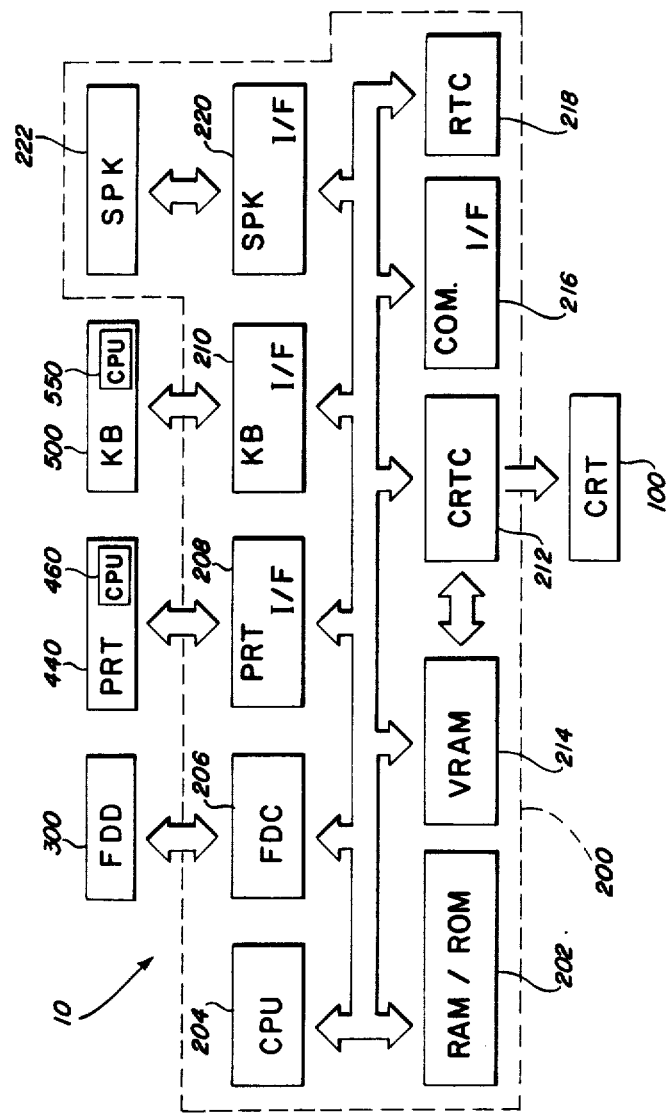
FIG. 2 is a block diagram of the system constituting the word processor shown in FIG. 1.

Referring next to FIG. 2, the body 200 of the word processor incorporates a central processing unit, abbreviated as CPU, 204 which performs a control operation in accordance with either a program read from the floppy disk driver 300 or the program stored in a read-only memory, abbreviated ROM, within an internal storage 202. The CPU 204 delivers control signals to the external equipment described above via a floppy disk controller 206, a printer interface 208, a keyboard interface 210, or a CRT controller 212 or performs a control operation according to the signal or program from the external equipment. Also connected to the bus line to the CPU 204 are a video RAM 214 for temporarily storing the image information displayed on the CRT 100, a communication interface 216 that is inserted during communication with other equipment or system, a real time clock 218 for calculating an actual time, a speaker interface, etc. A loud speaker 222 is connected to the interface 220, and acts to beep when an input error or other extraordinary phenomenon takes place, as described later.

Although the features of the novel word processor 10 constructed as mentioned above will become apparent from the flowcharts which are given later for illustrating the procedure of control operations, the gist is now described briefly. Specifically, when the power supply of the word processor is put to work (or in terms of circuit analysis when a reset signal is applied to the system or a reset command is produced), the CPU 204 first ascertains whether a floppy disk is installed in the floppy disk driver 300. If it is installed, then the CPU reads the program for word processing. Thus, ordinary processings are executed for the processor. The operator operates the keyboard 500 according to either the messages that are displayed on the screen 102 in the course of these processings or a predetermined procedure of operations to select a desired mode from writing mode, readout mode, printing mode, and other modes, determine a file name, designate the format, or effect other operation, thus carrying out a desired work.

For the conventional word processor, if a floppy disk is not installed at the time when the power supply is put to work, it may at best display a message "Install floppy disk". For the novel word processor, the CPU 204 switches the control mode to type through mode according to the program stored in the ROM in the internal storage 202. In this type through mode the printer 400 can be activated in quick response to its input data which is entered by operating the keyboard 500, principally the alphanumeric keys 504. This enables the operator to immediately perform a typing operation. Since the type through mode is established when no floppy disk is installed, the program for controlling the operations necessary to this mode is stored in the ROM within the internal storage 202 of the body 200. The operations of the word processor 10 in the type through mode are distinctively different from those in an ordinary electronic typewriters, as may also be understood from the flowcharts given later. Specifically, in this mode, the characters or sentences entered by operating the keyboard 500 are also displayed on the display device 100. When an operation is performed to move the cursor on the screen 102 of the CRT, the location at which the next character is printed by the printer 400 is automatically controlled by the movement of the cursor. One or more pages of text are automatically stored and can be repeatedly printed. When the control mode is switched from the type through mode to word processing mode, the information in the form of sentences now being displayed on the screen 102 of the CRT can be retained and utilized as it is, it being noted that this switching of the control mode can be made at any desired time.

A floppy disk (system disk or program disk) storing a program for word processing and a text file disk for storing and reading out edited information of document can be detachably installed in the floppy disk driver 300. These disks are separately controlled by the floppy disk controller 206 in performing a readout or writing operation. The installation of a disk in the floppy disk driver 300 can be detected by a sensor switch disposed in position within the space for holding such a disk. This structure is not shown, because those skilled in the art would readily realize it.

Alternatively or in addition to the detection of the presence of a disk by the sensor switch, the type through mode is selected when the given boot sector of a disk is not loaded into the space. This will be described in detail with reference to a flowchart later.

The appearance of the word processor 10 according to the invention is shown in FIG. 1. The processor is of a relatively sophisticated type and capable of operating in the aforementioned type through mode. Since it is also intended to be used as a conventional typewriter, its dimensions are limited and careful consideration is given to the design such that it can be installed on a typical office desk that measures 30 inch by 18 inch.

Figures 1, 11:
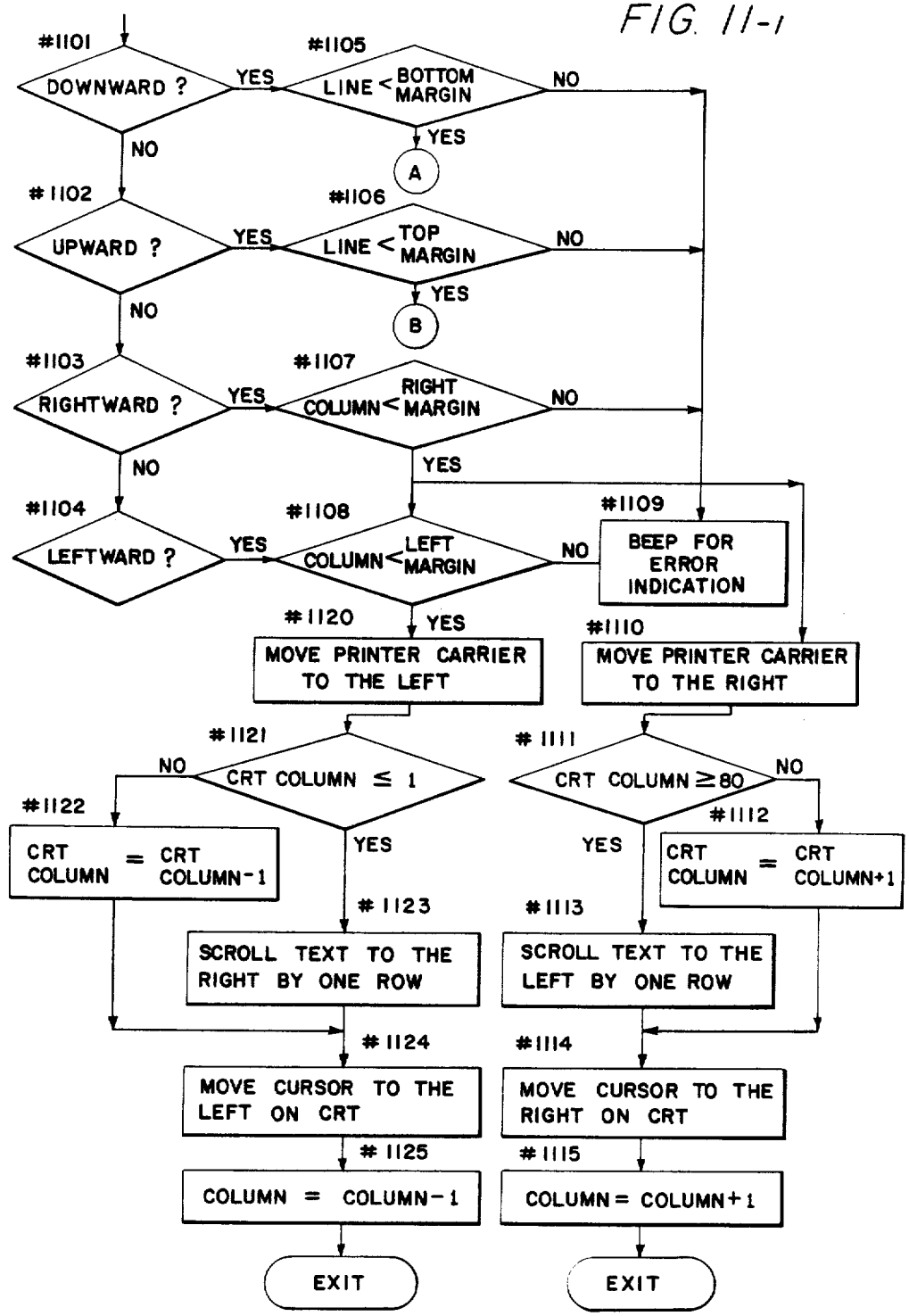
Figures 2, 11:
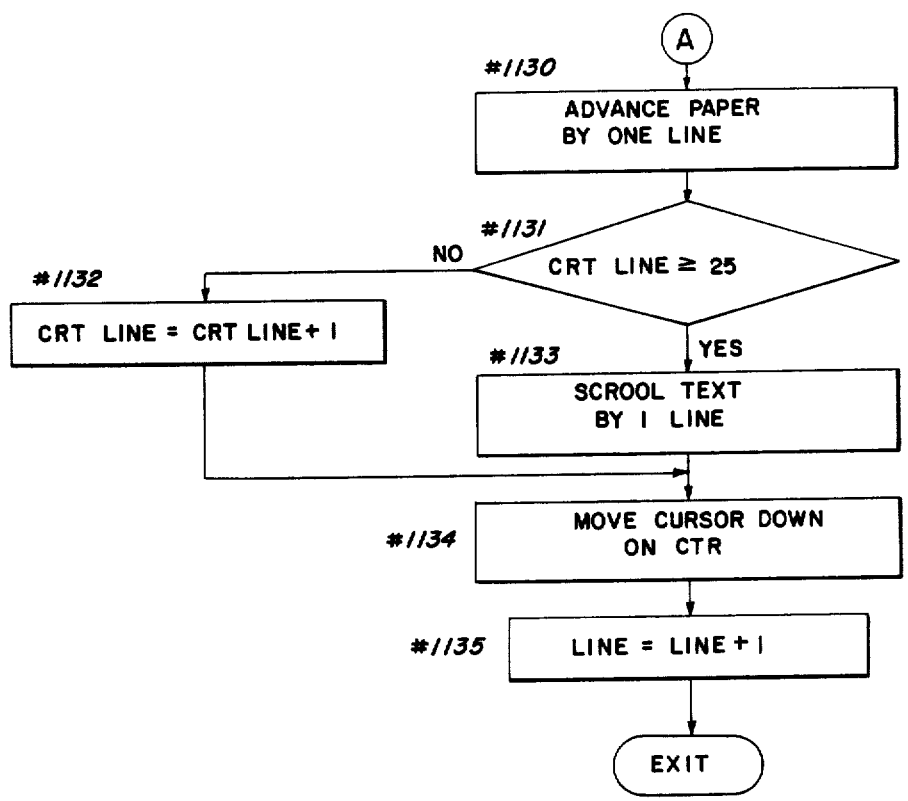
Figures 3, 11:
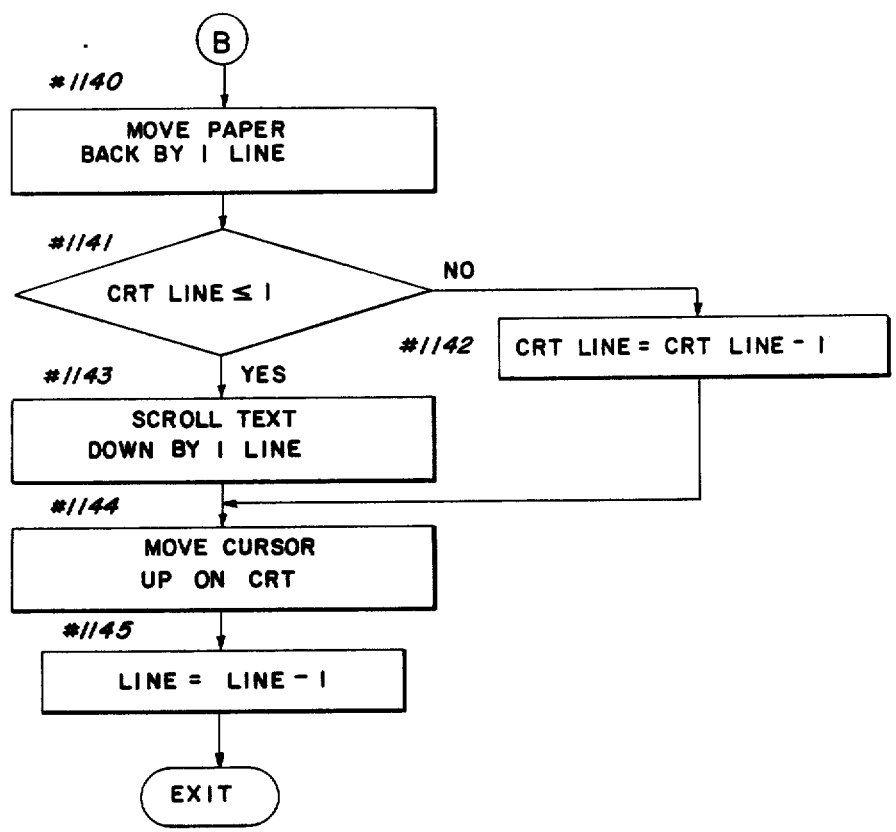
FIG. 3 is a plan view of the function key section of the keyboard 500 incorporated in the processor shown in FIG. 1.

Referring next to FIG. 3, the function key section 506 of the keyboard 500 of the processor 10 is shown in plan view. The keys 550 for moving the cursor are mounted in the function key section 506, and comprises four cursor keys 552, 554, 556, 558 for moving the cursor that is displayed to indicate the input position on the screen 102 of the CRT upward, downward, to the left, and to the right, respectively, in steps of one character, and first and second auxiliary keys 562 and 564, respectively. These auxiliary keys are used to change the unit step of the movement of the cursor to "WORD", "SENTENCE", "PARAGRAPH", "PAGE", "FILE", and so on. The specific manner in which the cursor keys 552, 554, 556, 558 and the auxiliary keys 562, 564 are operated in the word processing or type through mode is described later. In general, cursor keys of word processors and computer terminals are most frequently used for entering characters or for other operations, and they are similar in function. For these reasons, it is desired for operation that the aforementioned four cursor keys for the four directions are disposed in proximity. Accordingly, the four cursor keys 552, 554, 556, 558 of the word processor 10 are disposed in close relation to one another as shown in FIGS. 3 and 4. Each of the cursor keys tapers off to a point in the direction of movement of the cursor to indicate the direction. The proximate arrangement of the keys increases the possibility that wrong operation or simultaneous depression of two keys takes place. In the novel word processor 10, therefore, a partition wall or barrier 560 is formed among the cursor keys 552, 554, 556, 558 as shown in FIGS. 3, 4 and 5 to prevent wrong operation and simultaneous depression of plural keys.

The partition wall 560 is next described in further detail by referring to FIGS. 4 and 5; FIG. 4 is a perspective view of the cursor keys 552, 554, 556, 558 and the partition wall 560; and FIG. 5 is a cross-sectional view taken on line A—A of FIG. 1. When these cursor keys are not depressed, they protrude h1 above the top surface 570a of the protective cover 570 of the keyboard 500. Each of these cursor keys is depressed to the position shown by the broken line in FIG. 5, whereat it is h3 below the top surface 570a of the cover and the associated circuit is closed. The partition wall 560 is bonded to the cover 570 with adhesive or molded integrally with the cover such that it is surrounded by the keys 552, 554, 556, 558 disposed in the manner described above and is h2 above the top surface 570a, as shown in FIGS. 3 and 4. The height determined by h2 lies substantially intermediate between the height that is h1 above the top surface 570a when the key is not depressed and the height that is h3 above the top surface when the key is fully depressed. Thus, when the operator presses down a desired key, if the finger touches another key, the finger will make contact with the partition wall 560 before the latter key is fully depressed. This prevents the erroneously contacted key from closing the circuit, thereby avoiding simultaneous depression of two keys. Further, the operator can press down desired keys without seeing them, because each key is pointed in a plane in the direction in which the cursor is moved. In addition, the keys are separated by the partition wall 560, contributing to elimination of mistaken operation. Hence, the keyboard can be operated in a more efficient manner.

The partition wall 560 is shaped like letter "H" as shown, and has end portions 560a and 560b at the side of the operator. The end portions 560a and 560b extend on opposite sides along the keys 556 and 558, respectively, to prevent erroneous operation of the keys 556 and 558 with greater certainty. As shown in FIG. 5, the upper end portion 560c of the partition wall 560 is rounded so that operator's finger may slip down the partition wall 560, in order to make the usage of the keys more convenient. The upper cursor key 552 and the lower cursor key 554 are marked with a horizontal stripe, while the left key 556 and the right key 558 are marked with a vertical stripe, for permitting the operator to discern the keys with further ease.

[Detailed Description of Controls]

A. Type Through Mode

FIGS. 6–13 are flowcharts showing the manner in which various control operations are performed in the body 200 of the word processor 10. These control operations are hereinafter described in detail with reference to the flowcharts.

Figure 6:
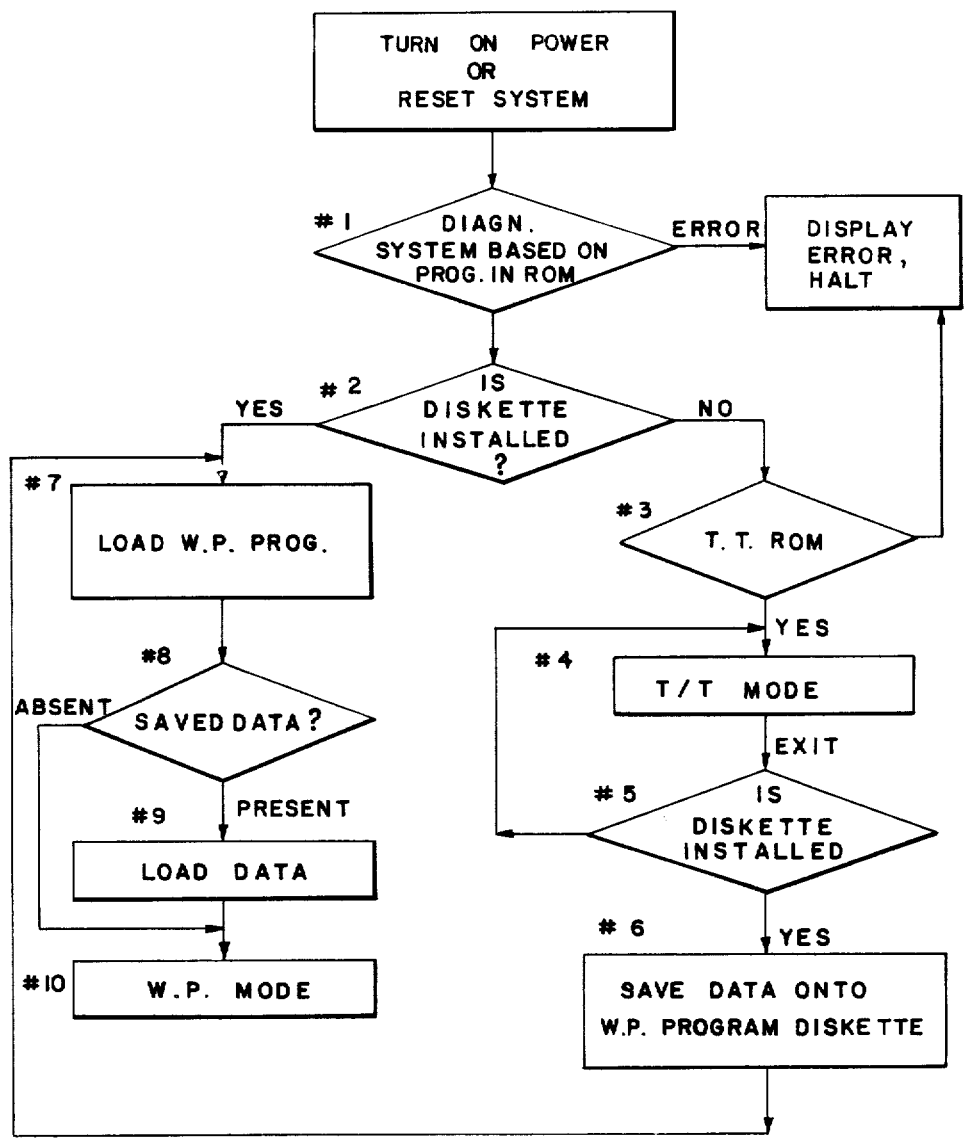

FIG. 6 is a flowchart showing the manner in which the mode is selected when the power supply of the word processing system is put to work or the system is reset, as well as the relation between type through mode (T/T mode) and word processing mode (W/P mode) either of which is selected at that time.

Figure 7:
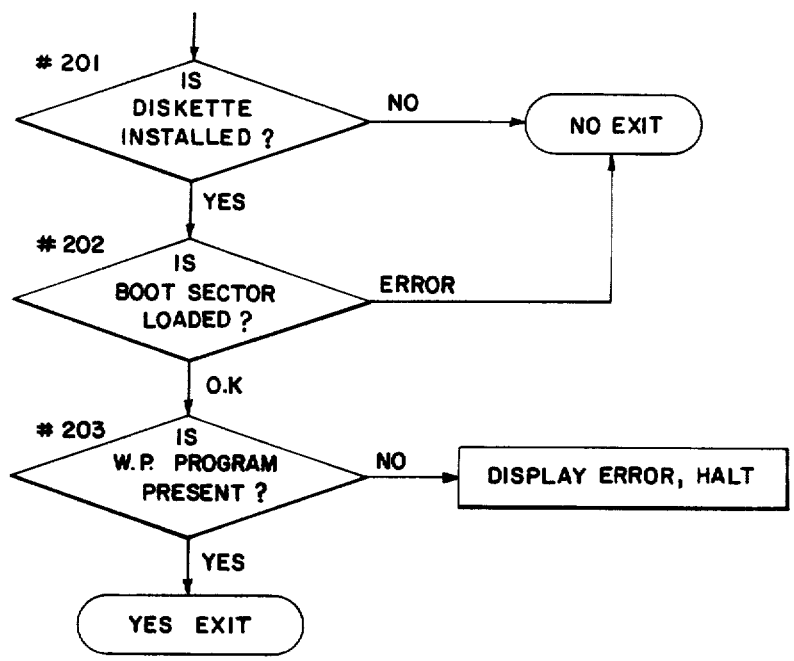

Referring specifically to FIG. 6, when the system is reset as by turning on the power supply, step 1 is performed to cause the program entered in the ROM of the internal storage 202 of the body 200 to diagnose the whole system. If any error is detected, the processor will beep, or if possible, the display device indicates the error condition, and the subsequent processings are halted. If necessary, the indication of error may involve the kind of error or the location at which the error has occurred. If no error is found in step 1, the flow proceeds to step 2 to ascertain whether a floppy disk (program disk) storing a program for performing the word processing mode is installed or not, step 2 being specifically shown in FIG. 7. If no program disk is found to be installed, the flow then proceeds to step 3 to make a self-check for ascertaining whether a program for the type through mode is entered in the ROM of the internal storage 202 of the body 200. If it is not entered, an error condition is displayed, and the subsequent processings are halted. If it is entered, the flow proceeds to step 4 to carry out operations in type through mode in the sequence of steps as specifically shown in FIG. 8. Then, step 5 is performed to ascertain whether a program disk is installed during the execution of operation in the type through mode. If it is installed, the flow proceeds to step 6 to cause the data of text which was typed in the type through mode to be saved onto the program disk. The details of step 5, which is a process similar to step 2, are shown in FIG. 7. Particularly, in step 6, the data about the format in the type through mode is saved onto the physical track immediately preceding the last physical track of the program disk, and the data about the text held in the page buffer (RAM of the internal storage 202) is saved onto the last track of the program disk.

If the flow exits from either step 2 or 6 by obtaining "YES" decision, it proceeds to step 7, where the program for word processing is loaded into the word processor from the program disk. Then, the flow proceeds to step 8 to judge the presence or absence of the data that has been saved by the process of step 6. If the data is present, the program proceeds to step 9, where the data is loaded into the word processor. Subsequently, the flow enters into step 10, where operations are executed in the word processing mode. In step 9, the data about the format or text which was saved onto the aforementioned track of the program disk in step 6 is loaded onto the first page of either the format data storage area or the text data storage area for the word processing mode. Also, when such saved data is present, the saved data which has been loaded is automatically displayed as a text in the word processing mode in step 10, thus permitting any arbitrary processing in this mode. Here, it is also possible to save data onto a document storage disk.

FIG. 7 is a flowchart showing the steps concerning the installation of a disk storing a program for word processing. First, step 201 is performed to ascertain whether such a program disk is installed or not. This judgment is made depending on the activation or inactivation of the switch which is mounted in the floppy disk driver 300 for detecting a diskette as previously mentioned in connection with the description of the structure of the system. If the switch is open, the flow exits from this sequence of processings, giving "NO" decision. If a diskette is detected in step 201, the flow proceeds to step 202 to ascertain whether the boot sector is loaded or not. The boot sector is loaded by an initial program loader that is set by the ROM of the internal storage 202. If the sector is not loaded, the flow again exits from this sequence of processings, yielding a result of "NO". If the sector is loaded, the flow proceeds to step 203 to ascertain whether a program for word processing is present on the disk or not. This judgment is made by loading the directory stored in the disk and judging the kind of the program based on its index. If step 203 ascertains the presence of the program, then the flow exits from this sequence of processings, yielding a result of "YES". If it is absent, the flow proceeds to step 204, where an error condition is displayed and the process ceases.

Figure 8:
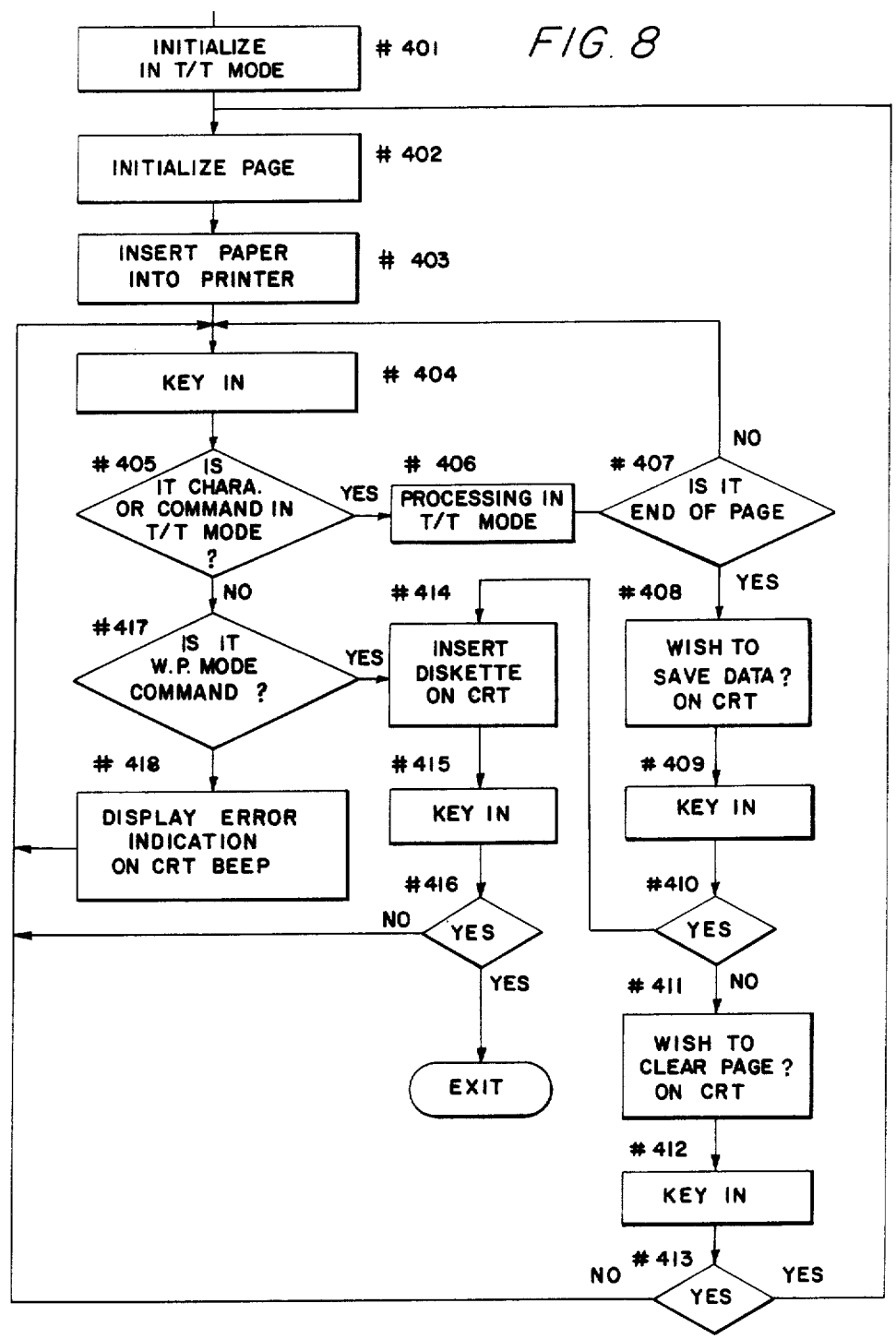

FIG. 8 is a flowchart showing the whole sequence of processings carried out by step 4 in FIG. 6, that is, the processings which are carried out in the type through mode according to the program stored in the ROM of the internal storage 202. When the type through mode is selected, step 401 is performed to initialize the printer 400 for the type through mode. That is, various factors of the printer including the pitch between succeeding characters, the space between neighboring lines, and the top, bottom, left and right margins are set to prescribed values, and tabulation positions are initialized. Typically, the tabulation positions are set for every five or eight characters.

Then, the flow proceeds to step 402, where initialization of page is effected. More specifically, the page buffer (RAM) is cleared, or blank data is introduced, and data about the print line and the print column is set for the top margin and the left margin, respectively. Further, "CRT line=1" and "CRT column=1" are set as the initial data for the display on the CRT 100. Then, the flow proceeds to step 403, where an indication "Insert paper into printer." is displayed on the screen 102 of the CRT. If the insertion of paper is ascertained, the printer operates to accept the paper, and the CRT 102 presents a display in response to this operation of the printer. These operations will be described in more detail later under the heading of "Printer and Related Controls".

Then, the flow proceeds to step 404, where the body of the word processor accepts data entered by means of the keyboard 500, followed by step 405 to ascertain whether the input data indicates characters to be printed or a command permitted by the type through mode. If the data indicates the characters or the command, the flow proceeds to step 406, where operations are carried out in the type through mode. The steps 404, 405 and 406 are repeatedly carried out until the completion of the page is ascertained by step 407. If the judgment made in step 405 is "NO", the flow proceeds to step 417 to ascertain whether the input from the keyboard 500 commands the body of the processor to assume the word processing mode. If the judgment is "NO", the flow proceeds to step 418, where an error condition is displayed on the screen 102 of the CRT and, at the same time, the body of the processor is caused to beep.

When printing for one page is completed or the operator halts the printing operation, the end of the page is ascertained by step 407. Then, the flow proceeds to step 408, where a message "Is data to be saved?" is displayed on the screen 102 of the CRT. Then, in step 409, the operator's response entered by means of the keyboard 500 is accepted while this display is being presented on the screen. Then, in step 410, the process to be taken is selected according to the input. Specifically, if the input, or the operator's response, is "NO" in step 409, the flow proceeds to step 411, where a message "Is page to be cleared?" is displayed on the screen 102. Then, the flow proceeds to step 412, where the input from the operator is awaited. If the response is "YES", the flow returns from step 413 to step 402, where initialization of page is effected. If the response is "NO" in step 412, the flow returns from step 413 to step 404, where the next keyboard entry is awaited.

If the operator's response is "YES" in step 409, of if the result of the decision made in step 417 is "YES", the flow proceeds to step 414, where a message "Install program disk for word processing." is displayed on the screen 102. Then, the flow proceeds to step 415, where the entry from the keyboard 500 is again awaited. If step 416 ascertains that the input is "YES", the processor comes out of the type through mode. If it is judged to be "NO", the flow returns to step 404, where the next keyboard entry is awaited.

Figure 9:
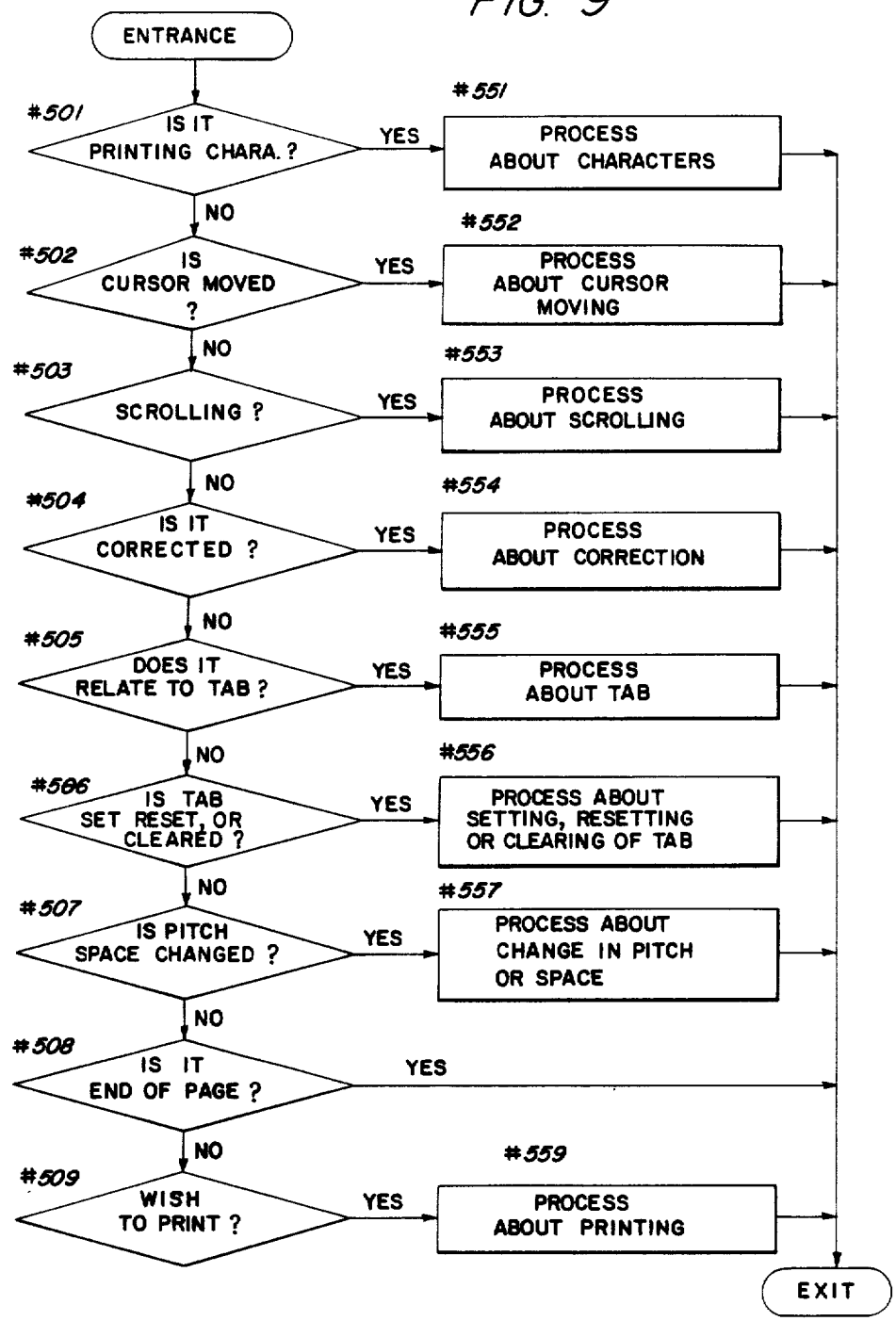

FIG. 9 is a flowchart showing a specific example of the operation in the type through mode performed in step 406 shown in FIG. 8. In this flowchart of FIG. 9, all or some of steps 551-559 are carried out according to the kind of input obtained in step 404 of FIG. 8.

Figure 10:
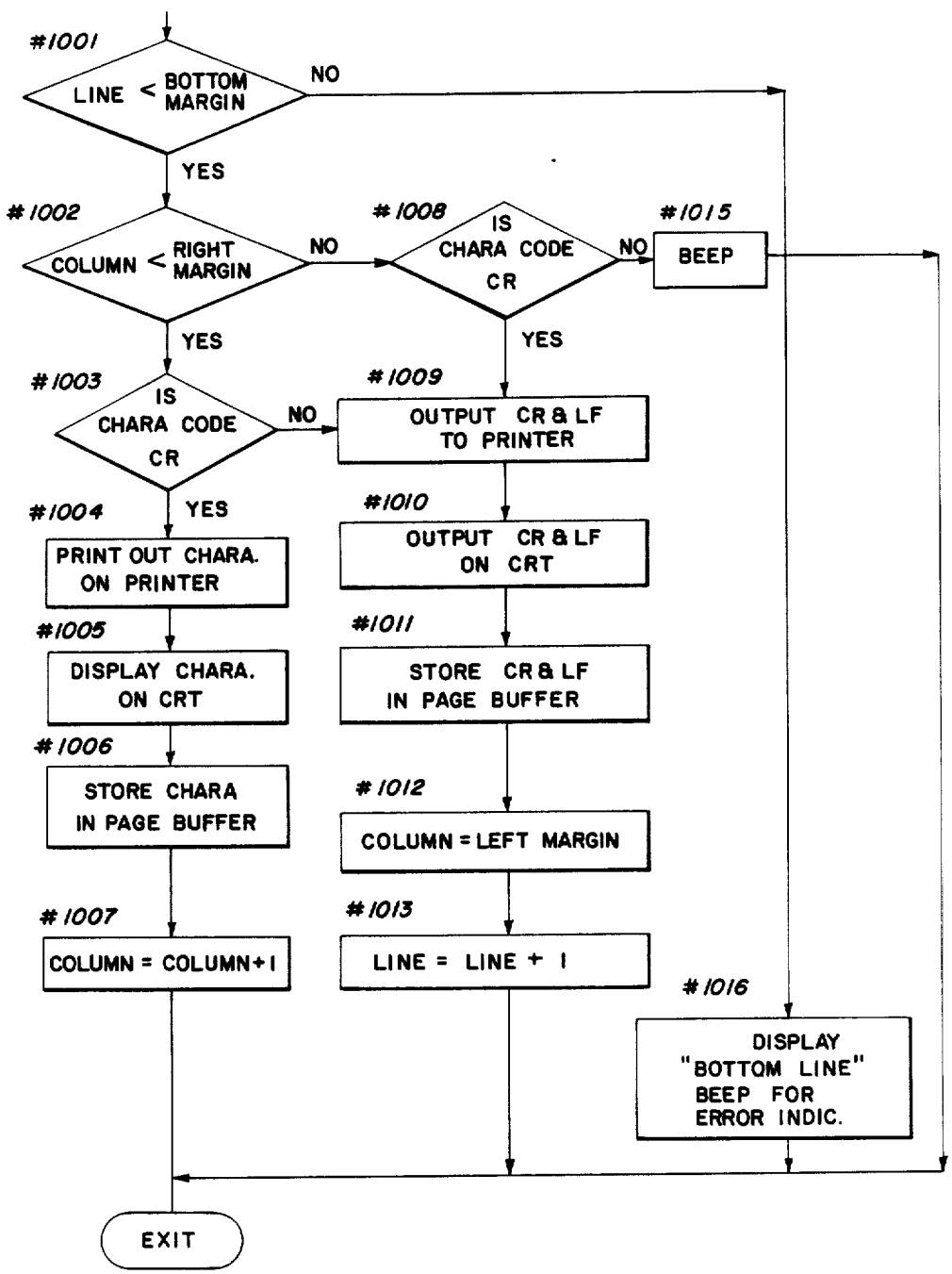

If step 501 ascertains that the input indicates characters to be printed, the flow proceeds to step 551, where the characters are printed. The details of step 551 is shown in FIG. 10.

If step 502 ascertains that the input indicates a movement of the cursor, then the flow proceeds to step 552, where the cursor is moved. The details of step 552 is shown in FIG. 11.

If step 503 ascertains that the input indicates scrolling on the screen, the flow proceeds to step 553, where the scrolling is performed on the screen. The scrolling is not described in detail herein, because the process necessary for it is similar to the process for a movement of the cursor.

Figure 12:
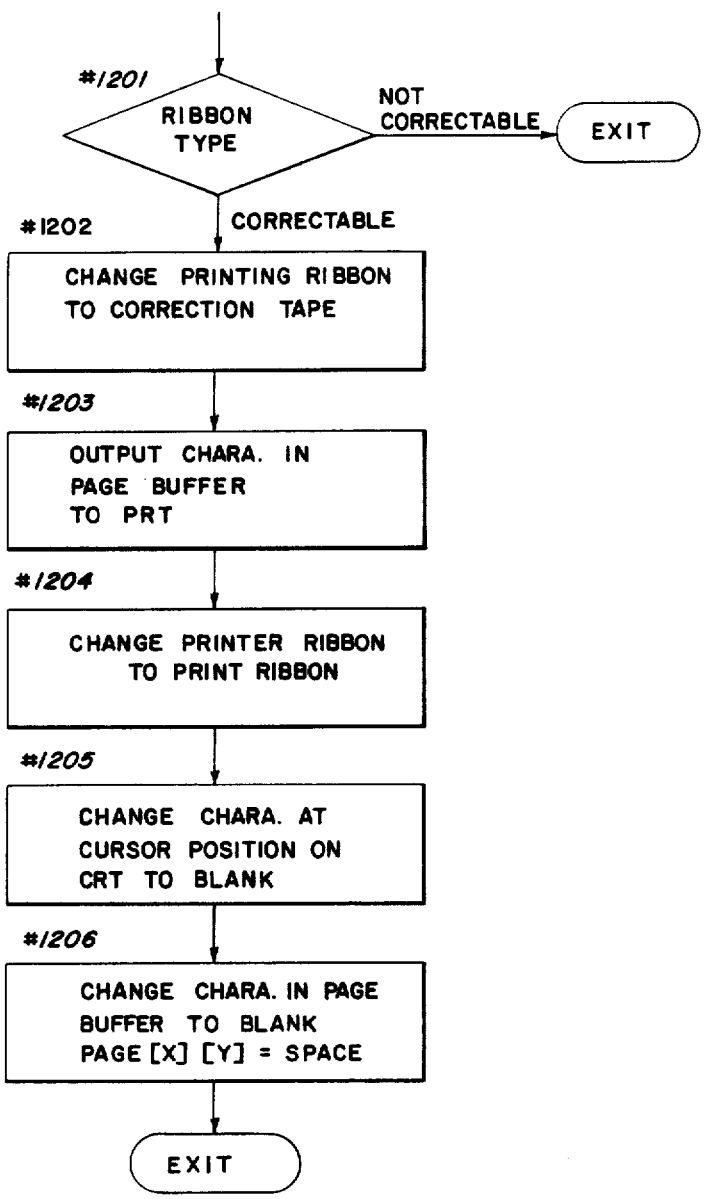

If step 504 ascertains that the input indicates a correction of typewritten characters, the flow proceeds to step 554, where the correction is made. The details of step 554 is shown in FIG. 12.

If step 505 ascertains that the input indicates a tabulation, the flow proceeds to step 555, where the process for the tabulation is performed.

If step 506 ascertains that the input indicates the setting, resetting, or clearing of the tabulation, the flow proceeds to step 556, where the tabulation is set, reset, or cleared.

If step 507 ascertains that the input indicates an amendment either to the pitch between successive characters to be printed or the interval between neighboring lines, then the flow proceeds to step 557, where the amendment is made.

The processings performed in steps 555-557 are well known in the art, and therefore the details of these processings are not described herein.

If step 508 ascertains that the final position of one page is reached during the operation controlled by the input from the keyboard 500 or that the operator has halted the page, then the end of the page is judged. Then, a signal representing this condition is sent to step 407 in FIG. 8.

Figure 13:
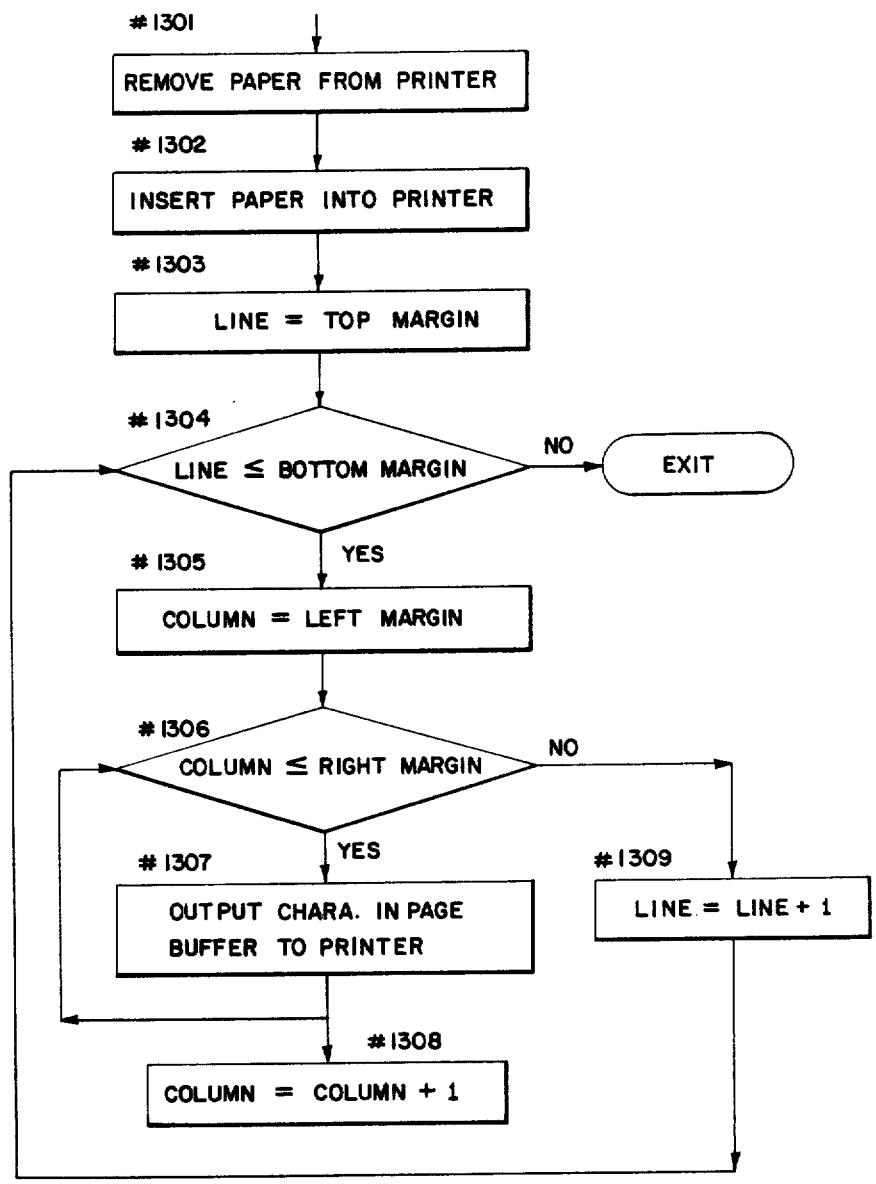

If step 509 ascertains that the print key (not shown) of the keyboard 500 is depressed or that a print command is applied, then the flow proceeds to step 559, where a printing operation is performed. The details of step 559 is shown in FIG. 13.

FIG. 10 is a flowchart showing printing of characters in the type through mode. This process is carried out by passing through steps 404 and 405 in FIG. 8 and step 501 in FIG. 9 when an entry from the keyboard 500 occurs. First, step 1001 ascertains whether the number of lines to be printed is less than the number set by the bottom margin upon keyboard entry. If the former number is equal to or greater than the latter, then the flow proceeds to step 1016, where an indication "Bottom Line" is displayed on the screen 102 of the CRT 100, and the body of the processor is caused to beep. Then, step 1002 is performed to ascertain whether the coordinate position of the printed column is less than the coordinate position set by the right margin upon keyboard entry. If the former position is equal to or greater than the latter, the flow proceeds to step 1008 to ascertain whether the input character code is a carriage return (CR) code or not. If it is not, the flow proceeds to step 1015, where the body of the processor is caused to beep to indicate an error, and printing operation is not performed. If step 1008 or 1003 ascertains that the input character code is a carriage return code, then the flow proceeds to step 1009, where a carriage return (CR) signal and a line feed (LF) signal are delivered to the printer 400. Then, the flow proceeds to step 1010, where a carriage return (CR) signal and a line feed (LF) signal are delivered to the CRT 100. Subsequently, the flow proceeds to step 1011, where the carriage return and line feed signals are stored in the page buffer, followed by step 1012, where the position of the left margin is set as the column position. Then, the flow proceeds to step 1013, where the number of lines in the memory pointer (MP) is incremented by one.

If step 1003 ascertains that the incoming character code is not a carriage return code, the flow proceeds to step 1004 and then to step 1005 to deliver the character code to the printer 400 and the CRT 100. Then, the flow proceeds to step 1006, where the character code is written into the page buffer. The flow then proceeds to step 1007, where the position of the column is incremented by one.

FIG. 11 is a flowchart which corresponds to step 552 shown in FIG. 9 and which shows the relation between a movement of the cursor on the screen 102 of the CRT in the type through mode and the position of printing in the printer 400. Although the following description relates the case where the cursor keys 552, 554, 556 and 558 are operated to move the cursor in steps of one character to the right or left or to move it in steps of one line upward or downward, the position of the print head carrier of the printer 400 or the position of paper (see FIG. 14) is also controlled in a manner similar to the process of FIG. 11 even when the positional relation between the cursor and the printed character is changed due to the processings in steps 553 and 555, for example, shown in FIG. 9.

Referring next to FIG. 11, steps 1101-1104 are performed to ascertain which of the cursor keys 552, 554, 556, 558 was operated. If the key 554 was operated for downward movement of the cursor, then the flow proceeds to step 1105. If the key 552 was depressed to move the cursor upward, then the flow proceeds to step 1106. If the key 558 was pressed down to move the cursor to the right, the flow proceeds to step 1107. If the key 556 was depressed to shift it to the left, the flow proceeds to step 1108. After these movements, the relation between the position of the moved line or column and the top, bottom, left or right margin is judged. If the cursor has been moved beyond the marginal position, the flow proceeds to step 1109, where the body of the processor is caused to beep to indicate an error.

If steps 1105 and 1106 ascertain that the cursor to be moved downward and upward, respectively, lies within their prescribed ranges of print line, then the flow proceeds to steps 1130 and 1140, respectively, where control signals are fed to the printer 400 to move the paper a distance of one line forward and backward, respectively, Then, steps 1131 and 1141 ascertain whether the cursor moves within the displayed lines on the screen 102 of the CRT while it is manipulated. If its range of movement lies within the displayed lines, the flow proceeds to steps 1132 and 1142, where the displayed lines are incremented and decremented, respectively, by one, and then the flow proceeds to steps 1134 and 1144, respectively, where control signals are furnished to the CRT 100 to move the cursor downward and upward, respectively. Then, the flow proceeds to steps 1135 and 1145, respectively, where the contents of the memory storing the position of the print line are incremented and decremented, respectively, by one. Then, if steps 1131 and 1141 ascertain that the cursor has moved out of the displayed region on the screen 102 of the CRT during its movement, then the flow proceeds to steps 1133 and 1143, respectively, rather than to the aforementioned steps 1132 and 1142. In steps 1133 amd 1143, the data about text displayed on the screen is caused to scroll up and down, respectively, by one line, amd then the flow proceeds to steps 1134 and 1144, respectively.

If steps 1107 and 1108 ascertain that the cursor moved to the right and left, respectively, lies within a predetermined print column, the flow proceeds to steps 1110 and 1120, respectively, where control signals are provided to the printer 400 to shift the carrier of the printer to the right and left, respectively.

Steps 1111 and 1121 ascertain whether the cursor moves out of the column displayed on the screen 102 of the CRT during the operation for moving the cursor. If it moves within the range of the column, the flow proceeds to steps 1112 and 1122, respectively, where the column displayed for the cursor is incremented (moved to the right) and decremented (to the left), respecti vely. Then, the flow proceeds to steps 1114 and 1124, respectively, where control signals are given to the CRT 100 to move the cursor to the right and left, respectively. The flow then proceeds to steps 1115 and 1125, respectively, where the contents of the memory storing the position of the print column are incremented and decremented, respectively, by one. If steps 1111 and 1121 ascertain that the cursor moves out of the range displayed on the screen 102, then the flow proceeds to steps 1113 and 1123, respectively, rather than to aforesaid steps 1112 and 1122. In steps 1113 and 1123, the data about text displayed on the screen is caused to scroll to the left and right, respectively, by one column. Thereafter, the flow proceeds to steps 1114 and 1124, respectively.

Figure 14:
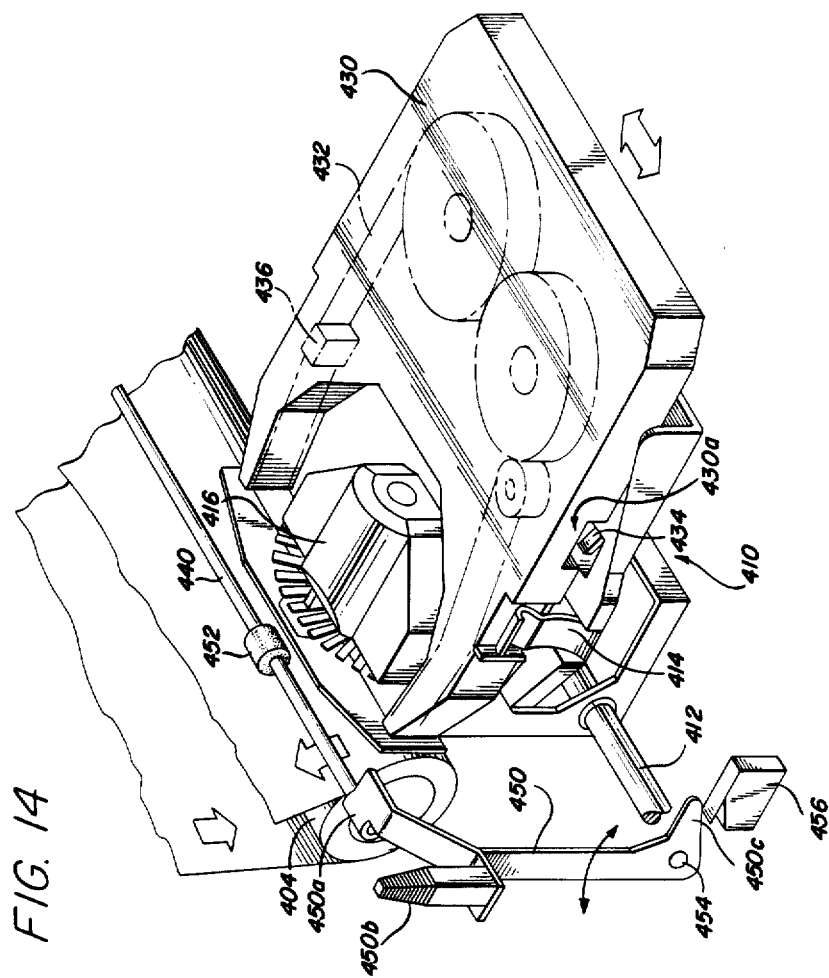
FIG. 14 is a fragmentary perspective view of the inside of the printer 400 shown in FIG. 1, for showing carrier 410 and bail lever 450.

FIG. 12 is a flowchart which corresponds to step 554 shown in FIG. 9 and which shows the manner in which printed characters are corrected in the type through mode. First, step 1201 is performed to ascertain whether the print ribbon (see FIG. 14) set in the printer 400 is correctable. If a cartridge having a fabric ribbon that is not correctable is set in the printer, the subsequent processings will not be carried out. If the keyboard 500 is operated to correct a character while a ribbon cartridge is mounted, a message "Not Correctable Ribbon" may be displayed on the screen 102 as needed. In order to know whether the printing ribbon set in the printer 400 is correctable or a fabric ribbon, a type of cartridge having a correctable ribbon, for example, and provided with a notch 430a in position is used, and a switch for detecting the notch 430a is mounted at the corresponding position in the section 410 mounting the cartridge, as shown in FIG. 14. The switch 434 is turned on or off, depending on the presence or absence of the notch.

If step 1201 ascertains that the ribbon is of the correctable type, the following processings are effected to correct a character. First, in step 1202, a command is output to the printer 400 to change the ribbon to a correction tape. Then, in step 1203, the character code in the page buffer corresponding to the correction position is output to the printer, and the character is erased for correction. Then, in step 1204, a command is output to the printer 400 to change the correction tape to the correctable printing ribbon. The flow then proceeds to step 1205, where the corresponding character on the screen 102 of the CRT is replaced by a blank (space). Subsequently, in step 1206, the corresponding character code in the page buffer is changed to a space code. A character to be printed which is entered by means of the keyboard immediately after these correction processings is processed in accordance with the foregoing process to handle printed characters, whereby correcting the character on the print paper.

FIG. 13 is a flowchart which corresponds to step 559 shown in FIG. 9 and which shows the manner of printing in the type through mode. Even in the type through mode, one page of data about the sentence entered by means of the keyboard can be stored in the page buffer in the body 200 of the word processor 10. Thus, by depressing the print key, the printer 400 can be operated in accordance with the contents of the page buffer. If a print command is generated in the type through mode, step 1301 is performed so that a command may be issued to the printer 400 to remove the paper. Then, the flow proceeds to step 1302, where processings which are the same as step 403 in FIG. 8 are carried out to insert paper into the printer. The processings regarding the insertion of paper will be described in detail later. Then, in step 1303, in order to initialize the printer for printing purposes, the print line is set to the position of the top margin. The printer 400 is then operated to print characters, in steps 1304-1309. Specifically, the character codes which are stored in the page buffer and include the carriage return (CR) code and the line feed (LP) code are output to the printer from the position of the left margin to the position of the right margin for every line until the print line reaches the position of the bottom margin, whereupon the operation is stopped.

As can be understood from the description made in connection with FIGS. 6-13, the novel word processor 10 has the following features:

(a) When the power supply is put to work under the condition that no program disk is installed in the floppy disk driver 300, the printer 400 can perform a printing operation in quick response to the input from the keyboard 500 in the type through mode. This allows the operator to carry out her typing operation without the need to perform cumbersome preliminary operations.

(b) When the power supply is put to work under the condition that a disk is installed in the floppy disk drive 300, if a program necessary to the word processing mode is not introduced from the disk, the type through mode can be automatically selected.

(c) In the type through mode, the printer can operate in quick response to the input from the keyboard and, at the same time, the input characters are displayed on the screen 102 of the CRT.

(d) The text which was entered by means of the keyboard in the type through mode can be processed in the word processing mode.

(e) When an operation is performed to move the cursor on the screen 102 of the CRT in the type through mode, the carrier of the printer 400 or the paper is so controlled as to reach the position corresponding to the cursor.

(f) The text which was entered by means of the keyboard in the type through mode is automatically stored in the RAM within the internal storage 202.

(g) A printing operation can be repeatedly performed based on the text stored in the RAM described above.

B. Printer and Related Controls

Figure 15:
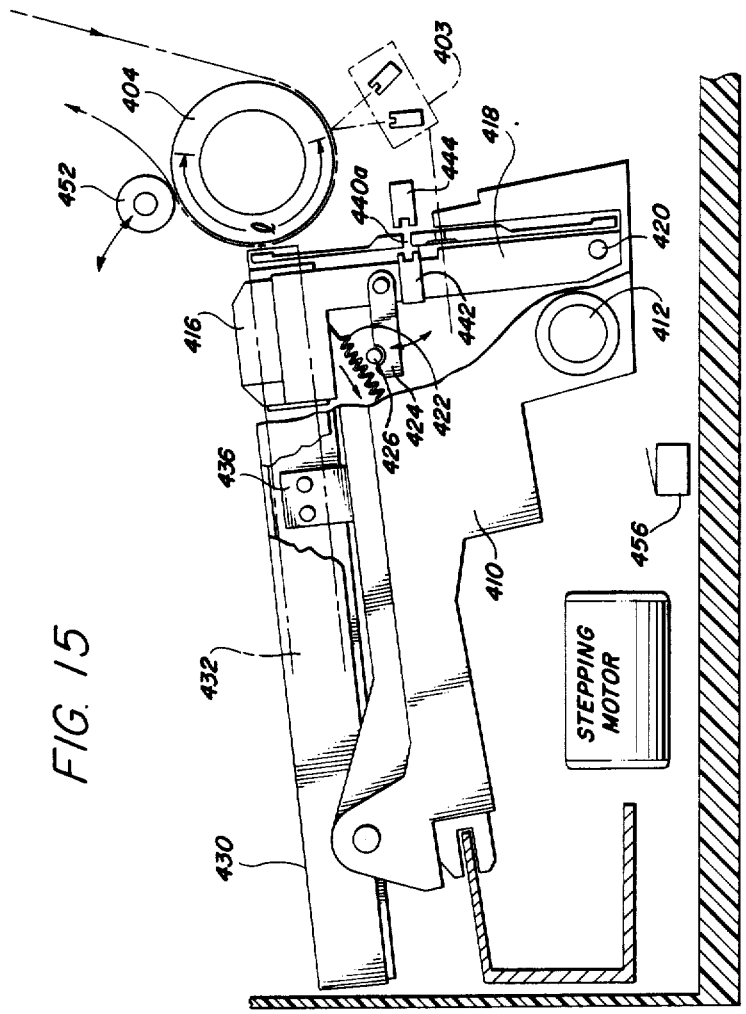
FIG. 15 is a fragmentary cross section of the body of the printer shown in FIG. 1, for showing the carrier 410 in partially cut-away side elevation.

The structure of the printer 400 is first described briefly with reference to FIGS. 1, 14 and 15; FIG. 14 is a perspective view of the portion of the printer 400 in which a carrier 410 and a bail lever 450 are mounted; FIG. 15 is a fragmentary cross section of the body of the printer, for showing the carrier 410 in side elevation. The carrier 410 is held by a platen 404 and a rail 412 extending parallel to the platen in such a way that it can slide along them. A printing ribbon cartridge 430 is set on the carrier 410 by being pressed down by leaf springs 414 on opposite sides. The cartridge 430 can readily be disengaged from the carrier 410. The position at which the cartridge is set is restricted by the shape of the portion of the carrier 410 that accepts the cartridge. The carrier 410 further includes a print head (hammer) 416 securely fixed to a support member 418 which is pivotally mounted to the carrier 410 by means of a pin 420. A spring 422 biases the support member 418 counterclockwise such that an engaging lever 424 fixed to the member 418 is kept in engagement with a pin 426. Under this condition, a printing operation can be performed. The lever 424 can be disengaged from the pin 426 by operating a release lever (not shown) so as to rotate the lever 424 counterclockwise. This causes the print head 416 to rotate counterclockwise together with the support member 418 until the member 418 bears on the pin 426, whereupon the head 416 is disengaged from the platen 404. Then, a print wheel 440, or a daisy wheel, can be mounted in position; otherwise the mounted wheel can be removed. A photodiode 442 and a photosensor (wheel index sensor) 444 which are disposed on opposite sides of the set position of the wheel 440 are used to sense whether the wheel is held in position. More specifically, a hole 440a is formed at a certain location of the wheel 440 to permit the light emitted by the photodiode 442 to reach the sensor 444 during rotation of the wheel only if the wheel 440 is held in position.

A given position 430a on the bottom of the print ribbon cartridge 430 is employed to detect the type of ribbon 432 in it. According to one rule, if the ribbon 432 is of correctable type, the bottom is notched or indented at the position 430a as shown in FIG. 14, while if it is a fabric ribbon, the bottom is planar. A switch 434 is disposed opposite to the position 430a of the carrier 410 such that the switch is closed or opened according to the type of the ribbon, in order to distinguish between plural types of ribbon. A reflective type photosensor (ribbon end sensor) 436 is disposed opposite to one surface of the ribbon 432 and at a suitable position within the cartridge 430 toward which the ribbon is fed, for detecting the rear end of the ribbon. To be specific, a suitable light-reflecting member (not shown) is stuck to the rear end of the ribbon 432. When light falls on the light-receiving portion of the ribbon end sensor 436, the end of the ribbon is detected.

A bail 452 is held by supports 450a disposed on opposite sides of the bail lever 450, which is rotatably held by a shaft 454 fixedly secured to a frame (not shown) mounted in the printer 400. A control member 450b protrudes above the body of the printer 400. When the control membe 450b is pushed and the bail 452 is moved away from the platen 404, a switch activating portion 450c formed on the bail lever 450 activates a microswitch (bail switch) 456. In this way, the open condition of the bail 452 is sensed.

As shown in FIG. 1, the front upper portion 406 of the outer cover of the printer 400 is so designed as to be rotatable about a pivot 408 in the direction indicated by arrow A. The print ribbon cartridge 430 can be loaded or replaced with another by opening this portion 406 (hereinafter referred to as "cover"). The opening or closure of the cover 406 is detected by a sensor 458 such as a microswitch (see FIGS. 16 and 17). Similarly, a print head cover 407 can be opened in the direction indicated by arrow B to allow the wheel 440 to be installed or removed. The opening or closure of the cover 407 is detected by a sensor 459 (see FIGS. 16 and 17).

Figure 16:
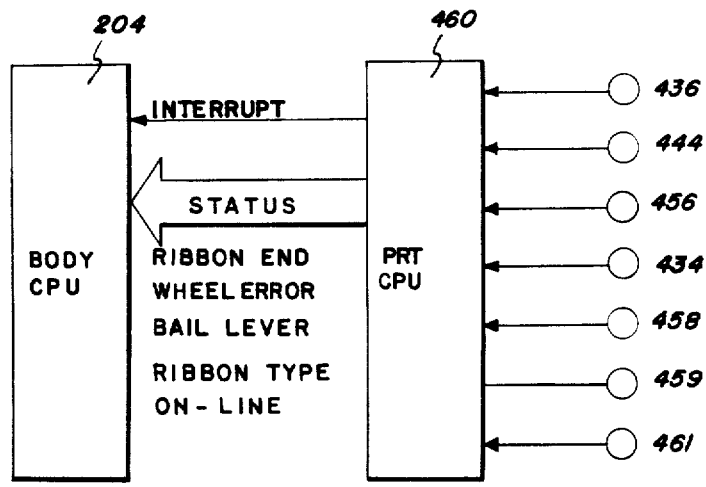
FIGS. 16 and 17 are diagrams for illustrating the functions of the central processing unit 460 in the printer 400 of the word processor shown in FIG. 1, in connection with the central processing unit 204 in the body of the processor.
Figure 17:
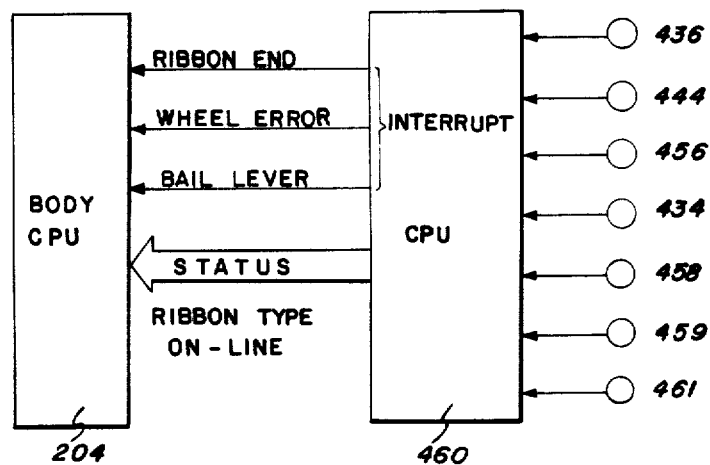

The electrical signals delivered from these sensors and switches which are disposed in the printer 400 as described above are applied to a central processing unit, abbreviated CPU 460 that is mounted in the printer 400 for controlling the printer, as shown in FIGS. 16 and 17. The CPU 460 for the printer is connected with the CPU 204 within the body 200 of the word processor 10, and acts to transfer an interrupt signal or status information to the CPU 204 in response to the outputs from the aforementioned sensors in the printer 400. Specifically, when the end of the ribbon or incorrect installation of the wheel 440 is detected, the print operation is to be halted. Also, operation of the bail lever 450 means that a sequence of steps will be executed to insert paper. When a signal resulting from any one of these detection and operation is applied to the CPU 460 for the printer, the CPU 460 delivers an interrupt signal to the CPU 204 in the body. There are two processes which can be performed at this time, as shown in FIGS. 16 and 17.

In the process shown in FIG. 16, only one interrupt signal is used. Status information indicating from what sensor the interrupt signal is delivered is fed from the CPU 460 for the printer to the CPU 204 in the body.

In the process shown in FIG. 17, a plurality of interrupt signal lines are provided from the CPU 460 to the CPU 204 such that a different signal line is used according to each individual sensor that furnishes its output signal to the CPU 460 for the printer. Thus, the CPU 204 in the body identifies the sensor based on the excited interrupt signal line. The process which is performed in the CPU 204 in the body when an interrupt signal has occurred as shown in FIG. 16 is described below the reference to the flowcharts of FIGS. 18-21. The output from the ribbon type sensor 434 is fed as status information to the CPU 204 in the body.

Figure 18:
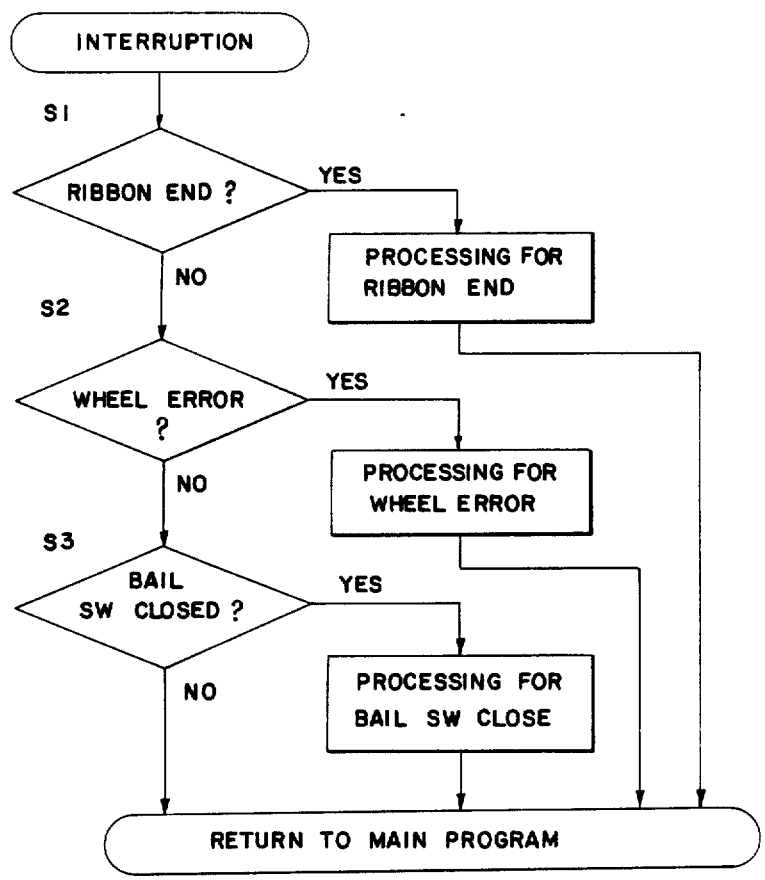
FIG. 18 is a flowchart showing the whole process which is performed when the operation of the CPU 204 in the body of the processor is interrupted.

FIG. 18 is a flowchart showing the general process executed when the CPU 204 in the body receives an interrupt. When the CPU 460 in the printer delivers an interrupt signal, step S1 is performed to ascertain whether the end of the ribbon is reached. Then, step S2 is performed to ascertain whether an error has occurred in the wheel. Then, step S3 is performed to ascertain whether the bail has been opened. If the result of the decision is "YES", the corresponding process is carried out.

Figure 19:
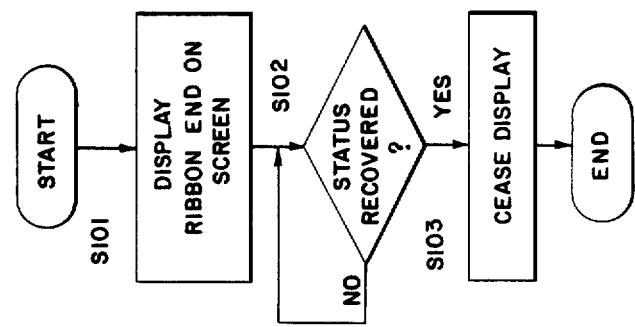
FIG. 19 is a flowchart showing one specific example of the process shown in FIG. 18 which is performed when the ribbon end is detected.

FIG. 19 shows one specific example of the process which is performed when the end of the ribbon is detected as shown in FIG. 18. When the end is detected, the CPU 460 for the printer comes to fault, halting the printing operation. At the same time, the carrier 410 is moved to the central position under the control of the CPU 460. At this time, in step S101, the CPU 204 in the body presents on the screen 102 of the CRT a message to the effect that "Replace ribbon with another. Then, depress on-line switch." Then, in step 102, the arrival of the input of status information from the CPU 460 for the printer is awaited. Under this condition, the operator opens the cover 406, replaces the ribbon cartridge 430 with a new one, and closes the cover 406. This causes the sensor 458 to produce an output signal that brings CPU 460 for the printer to the condition in which the cartridge is reset. Then, the CPU restores the carrier 410 to its original position where it was halted. Under this condition, if the operator depresses the on-line switch 461 (see FIGS. 16 and 17), the status changes, which is sensed by the CPU in the body, in step S102. Then, the flow proceeds to step S103, where the display presented on the CRT is caused to cease, whereby completing the process.

Figure 20:
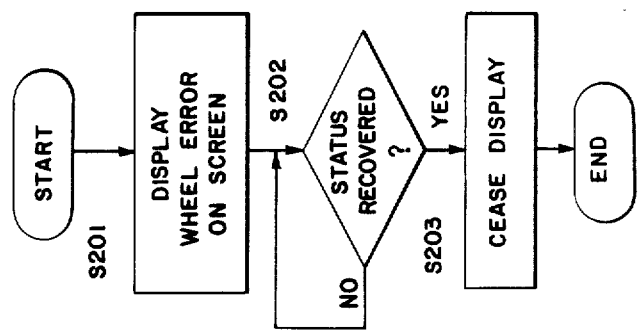
FIG. 20 is a flowchart showing one specific example of the process shown in FIG. 18 which is performed when a wheel error is detected.

FIG. 20 shows one specific example of the process which is performed when a wheel error is detected as shown in FIG. 18. When an incorrect setting of the daisy wheel 440 is detected, the CPU 460 for the printer comes to fault, i.e., the condition in which it can no longer operate, in the same way as the case where the ribbon end is detected. At this time, in step S101, the CPU 204 in the body presents on the screen of the CRT a display to the effect that "Wheel is incorrectly set. Reset it, close cover, and depress on-line switch". Then, in step S202, arrival of status information from the CPU 460 for the printer is awaited. Under this condition, the operator may open the cover 407, reset the print wheel 440, and close the cover 407. This causes the sensor 459 to produce an output signal. Then, if the operator depresses the on-line switch 461, the CPU 460 for the printer supplies status information indicating that the error has been corrected to the CPU 204 in the body. The CPU 204 ascertains this correction, and then the flow proceeds to step S203, where the display presented on the CRT is caused to cease. Thus, the process is completed.

It is also possible, in the processes of FIGS. 19 and 20, to feed status information indicating that the fault has been corrected to the CPU 204 in the body in response to the closure of the cover 406 or 407 without requiring the operator to press down the on-line switch 461.

Figure 21:
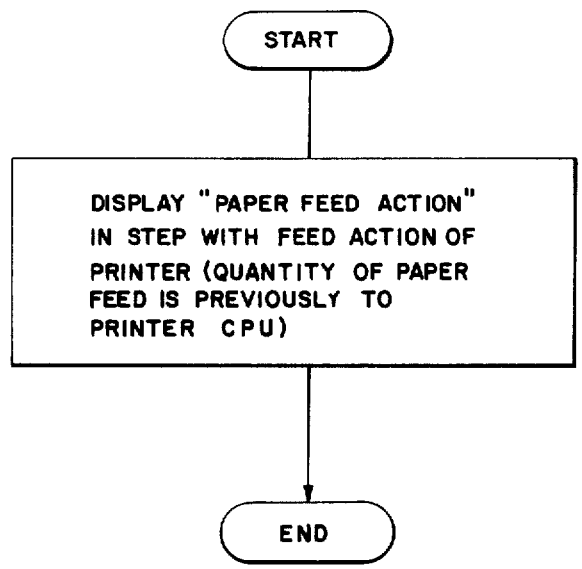
FIG. 21 is a flowchart showing the process of FIG. 18 that is performed to close the bail switch.

FIG. 21 shows the process that is performed when the bail switch is closed as shown in FIG. 18. As an example, when paper is inserted into the printer 400, the paper is inserted into a given position along the platen 404, and the bail 452 is moved away from the platen to activate the bail switch 456, thereby rotating the platen 404 for a certain time under the control of the CPU 460 for the printer. When the switch 456 is turned on, the CPU 460 begins to interrupt the CPU 204 in the body. Then, the ends of the paper displayed on the screen 102 of the CRT are caused to scroll in synchronism with the paper feed action of the printer under the control of the CPU 204. More specifically, as conceptually represented in FIG. 22, when the bail switch 456 is turned on, one end 150 of the paper displayed on the screen 102 is caused to scroll up from the bottom position at which the input is displayed to the position indicated by the solid line for a period of time substantially equal to the time taken to feed the paper actually. At this time, the quantity of feed of the paper in the printer 400 varies depending on the setting of the top margin on the print paper. It is also possible to change the time taken for the display on the screen 102 to travel its full distance, according to the quantity of feed. As the top margin is altered, the initial position 151 of displayed characters can be changed accordingly.

Figure 23:
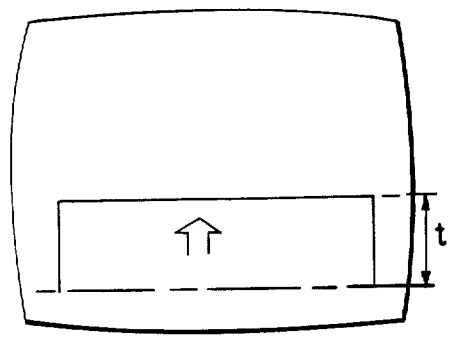

FIG. 23 shows another example of display, where the displayed end 150 of the paper is caused to scroll up on the screen 102 from the bottom, or input, position until a distance nearly equal to the distance traveled by the paper in the printer 400 is traveled. The initial position 151 of the displayed characters on the screen 102 becomes the left end of the bottom position of display in connection with the displayed end 150 of the paper. In this case, the top margin varies in step with the change in the position of the end 150.

Although the aforementioned process performed when the ribbon end or a wheel error is detected can be carried out in the same way, whether the processing mode or type through mode is selected, the process performed when the bail switch is closed can be limited only to the type through mode for the following reason. In the type through mode, the printer 400 operates in quick response to the input from the keyboard, and the text is displayed on the screen in synchronism with the printing operation. Accordingly, the process of FIG. 21 can be considered to be particularly useful for the operator.

With respect to the display of the paper end, the paper end 150, characters, etc. displayed on the screen 102 can be moved in synchronism with the movement of the paper caused by a typing operation after the operations associated with the setting of paper are displayed according to the above-described process that is effected upon closure of the bail switch. Examples of this kind of display are shown in FIGS. 24(a)-24(c).

Figure 22:
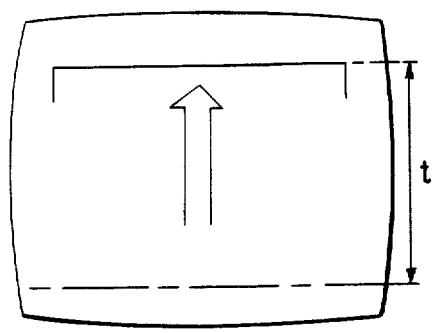
FIGS. 22 and 23 are conceptual representation of the display presented on the screen 102 of the CRT of the word processor shown in FIG. 1.
Figure 24A:
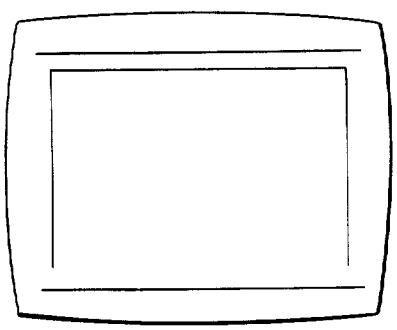
FIGS. 24(a)-24(c) are views showing the manner in which the ends of paper are represented on the screen 102 of the CRT of the word processor shown in FIG. 1.
Figure 24B:
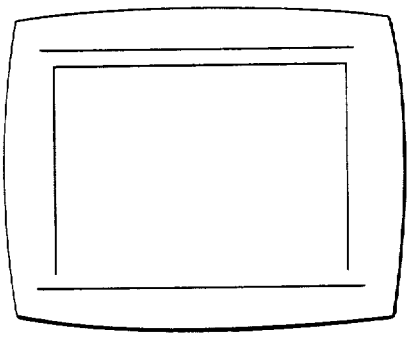
Figure 24C:
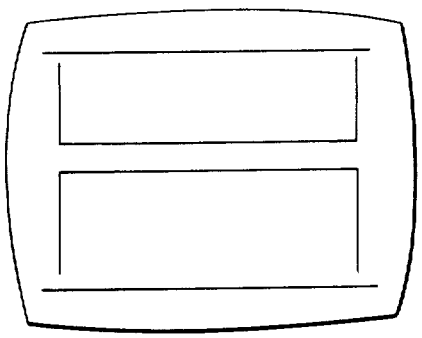

FIG. 24(a) shows the initial condition of the displayed end 150 of the paper shown in FIG. 22. FIG. 24(b) shows the condition in which the displayed top end has moved out of the screen 102, while only both side ends still remain displayed on the screen. During this process, the display of text is caused to scroll up such that the characters on the screen 102 also move up consecutively in the same manner as the characters printed on the paper (refer to the aforementioned process which is performed to move the cursor and has already been described in connection with FIG. 11). FIG. 24(c) shows the condition in which the bottom end of the paper appears on the screen after a further typing operation. After the completion of the printing on the first sheet of paper and subsequent storage of the text in the memory, if the printing on the second sheet of paper ensues, then the bottom end of the first sheet of paper is followed by the top end of the second sheet of paper on the screen, as shown in FIG. 24(c). The same applies to the case where all the contents of the memory are displayed on the screen and are subjected to scrolling operation when two or more pages of text are stored in the memory.

It is relatively easy to prepare a program to display the width of lines or the bottom line on the screen of the CRT according to the input, which represents the information about the size of the paper used and is applied to the CPU 204 in the body, if the paper is of a standard size.

Figure 25A:
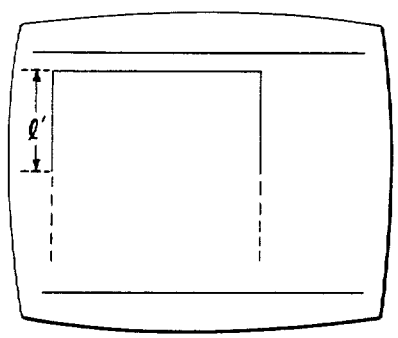
FIGS. 25(a) and 25(b) are views showing the display presented on the screen 102 when a nonstandard size of paper is used.
Figure 25B:
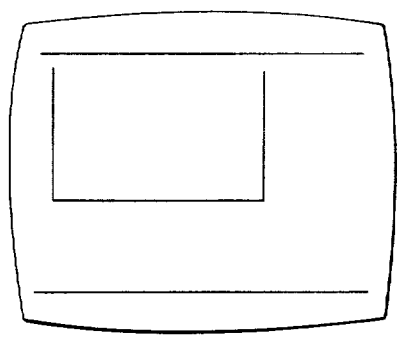

If the paper used is of a nonstandard size, the ends of the paper can be displayed on the screen 102 in the manner described below, for example. As shown in FIG. 1, at least one position-limiting member 405 capable of sliding horizontally across the paper is mounted on the paper guide 402 on the printer 400 to limit the lateral position of the paper. The position of this movable member 405 is sensed by a potentiometer or similar device to obtain data about the width of the paper. A reflective type photosensor 403 is disposed opposite to the platen 404, as shown in FIG. 15, to sense the presence or absence of paper. Thus, if paper is sensed by the sensor 403, it can be seen that the paper has a length at least equal to length l at the initial set position. An example of display presented on the screen 102 in this case is shown in FIG. 25(a), where the portion of the paper which is not sensed by the sensor 403 is indicated by the broken lines. Then, as the paper is fed, the actual bottom end of the paper is sensed by the sensor 403, when the bottom end is displayed on the screen 102 by a solid line as shown in FIG. 25(b). The data about the length is stored in the RAM in the body together with the text, and therefore when the display on the screen 102 is later caused to scroll or subjected to other process, the paper is displayed down to the bottom end by solid lines, independently of the output from the sensor 403.

As thus far described, in the novel word processor 10, when the ribbon end or a wheel error is detected and the printer has come to fault, the actions to be taken are displayed on the screen 102 of the CRT, based on the data transferred from the CPU for the printer to the CPU in the body. Therefore, the operator can readily take correct actions to correct the fault. Also, since the ends of the paper displayed on the screen 102 of the CRT are caused to scroll in step with the actual movement of the paper upon closure of the bail switch or in other case, the operator can manipulate the display presented on the screen 102 with such a feeling that she manipulates a typewriter. Hence, the features of the type through mode can be effectively utilized.

If the output from the sensor 434 (FIG. 14) for sensing the type of ribbon has led to the conclusion that the installed ribbon is a fabric one, a message to the effect that "Fabric ribbon is in printer. No amendment can be made. OK?" can be displayed on the screen 102, thus calling the operator's attention. Based on the output from the sensor 434 for discriminating between plural kinds of ribbon, step 1201 shown in FIG. 12 is performed to make the judgment in the process for correction.

C. Keyboard and Related Controls

Referring back to FIGS. 1–5, the keyboard 500 in the word processor 10 is connected with the CPU 204 in body via a keyboard interface 210 in the body 200. The keyboard incorporates a one chip microcomputer 550 (hereinafter referred to as "KB-CPU") for controlling purposes. The KB-CPU 550 serves to supply a signal to the CPU 204 in the body in response to the input from the keyboard, and to execute a sequence of operations according to the instruction fed from the CPU 204 in the body.

Figure 26:
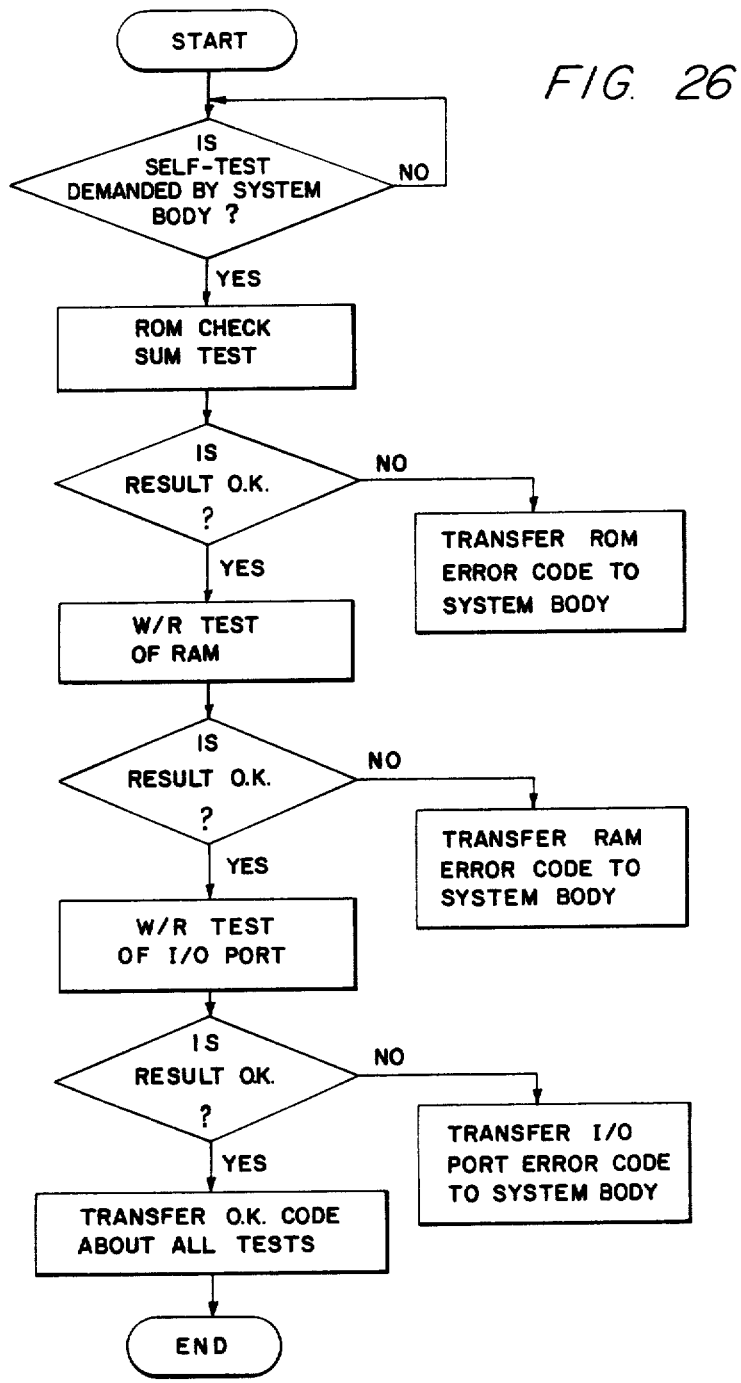
FIG. 26 is a flowchart showing a diagnostic test performed by a CPU 550 incorporated in the keyboard to diagnose the keyboard itself.

When the power supply is put to work, the CPU 204 in the body requires the KB-CPU 550 to make a diagnostic test for diagnosing itself. Then, the KB-CPU 550 initiates the process of the self-check shown in FIG. 26. Specifically, after ascertaining that the CPU 204 in the body has requested a self-check, the KB-CPU 550 performs various tests including "ROM check sum test", "RAM Write & Read test", and "I/O port Write & Read test". If the result of a test indicates some form of error, the corresponding error code is transferred to the CPU 204 in the body. If the results of all the tests indicates no error, then a code representing it is sent to the CPU 204 in the body. The CPU 204 distinguishes between these incoming codes. If an error is sensed, a message indicating the faulty location is displayed on the screen 102 of the CRT, or other process is performed.

Figure 27:
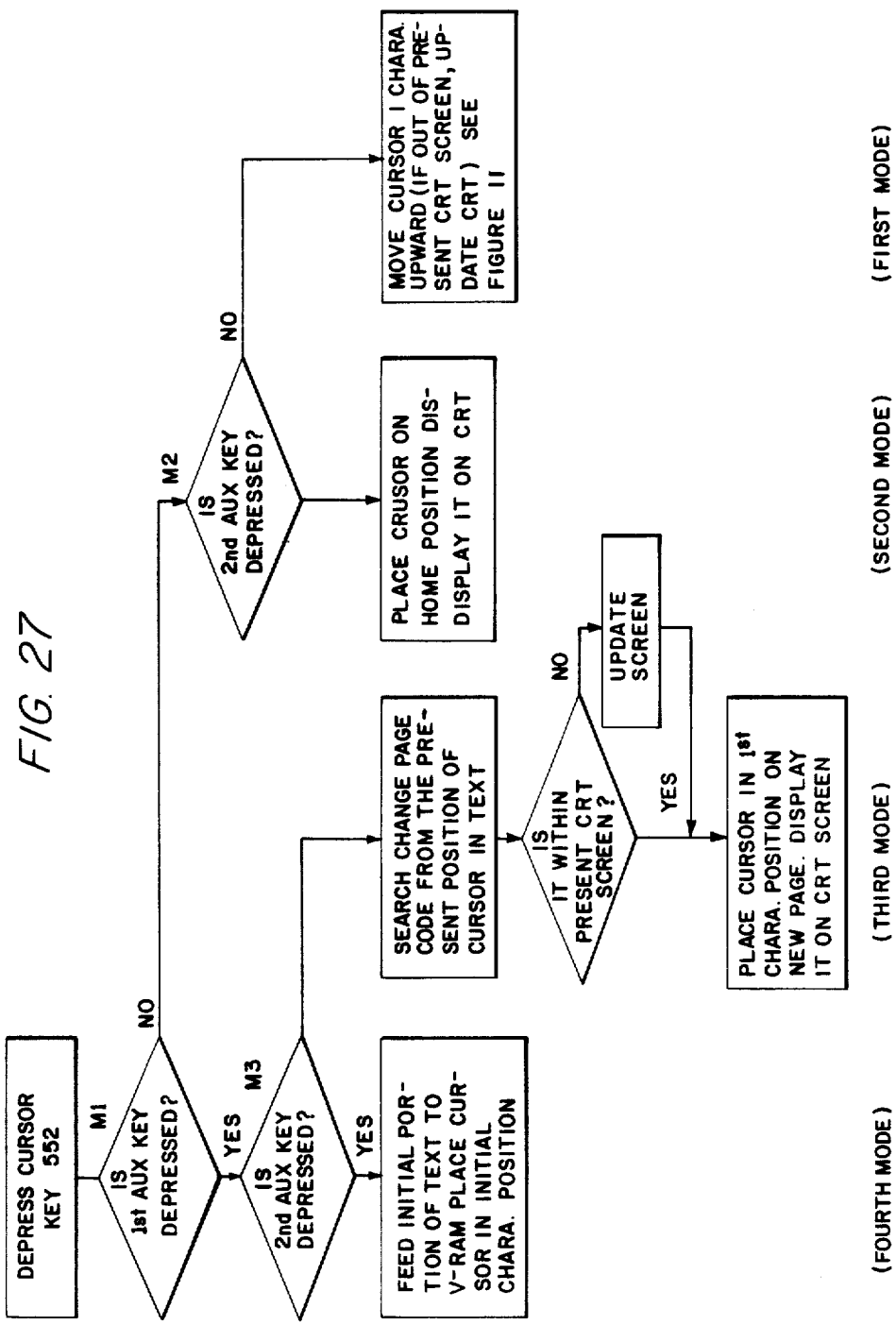
FIG. 27 is a flowchart showing the processings associated with the operation of the cursor key 552 for moving the cursor upward.
Figure 28:
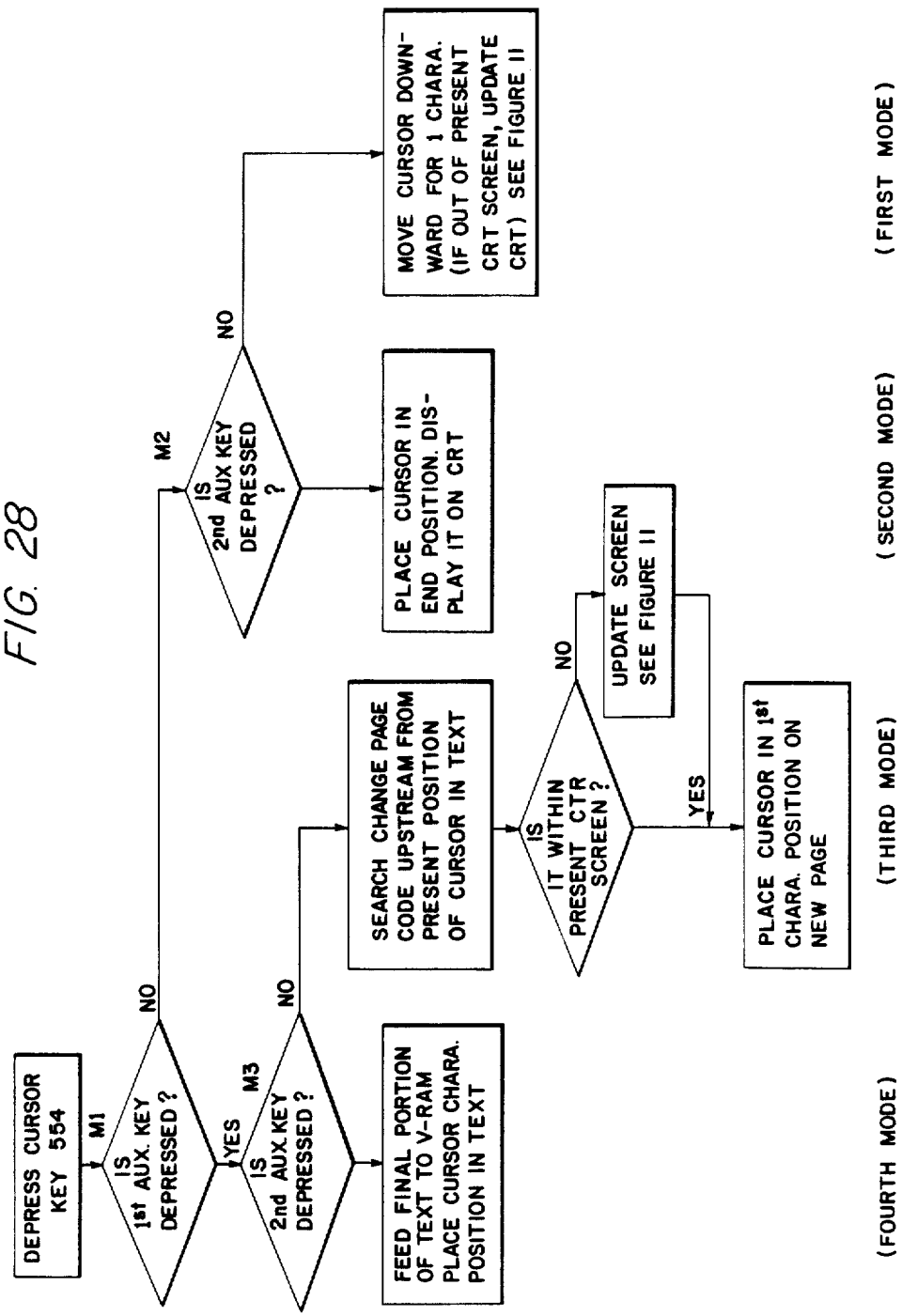
FIG. 28 is a flowchart showing the processings associated with the operation of the cursor key 554 for moving the cursor downward.
Figure 29:
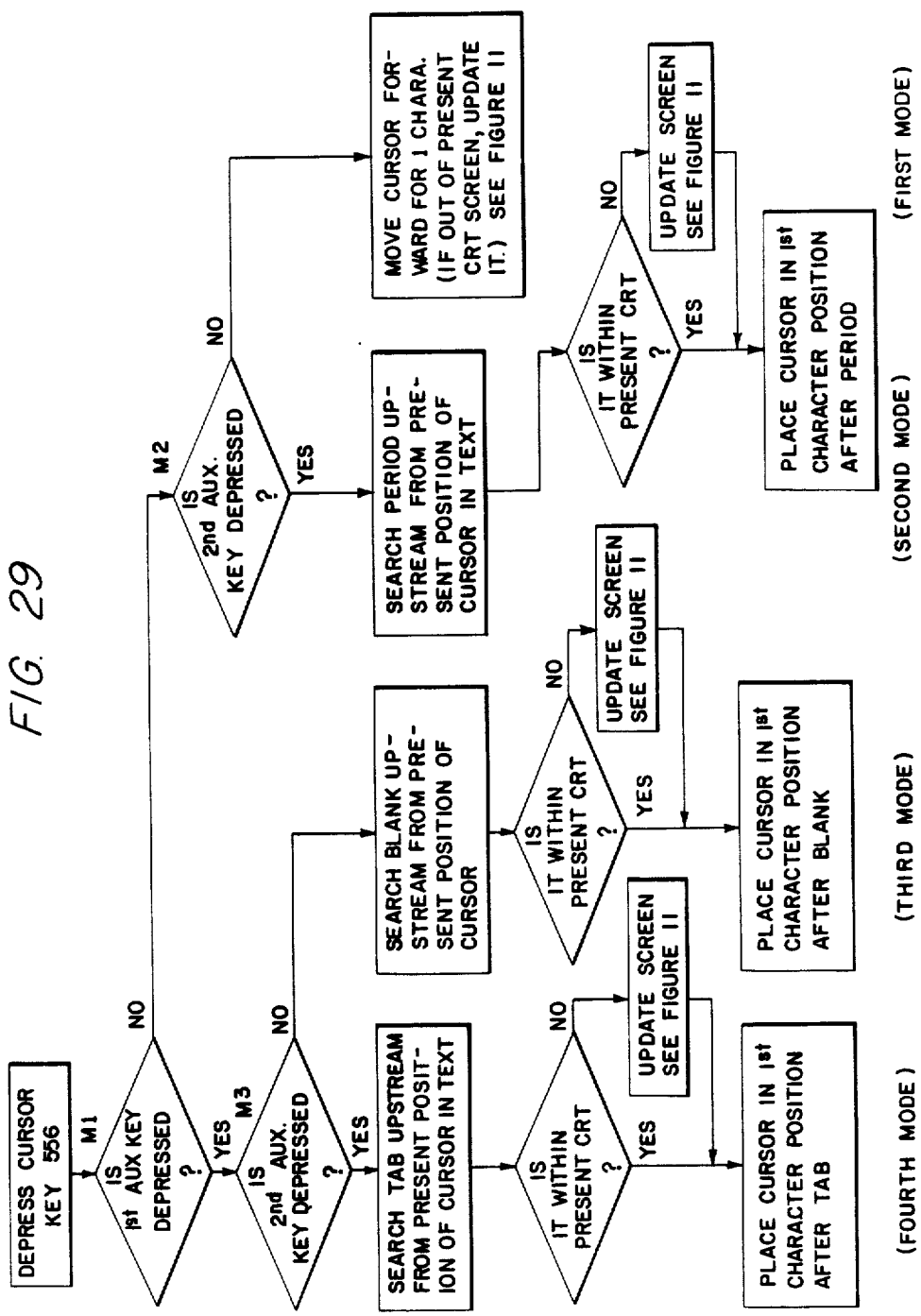
FIG. 29 is a flowchart showing the processings associated with the operation of the cursor key 556 for moving the cursor to the left.
Figure 30:
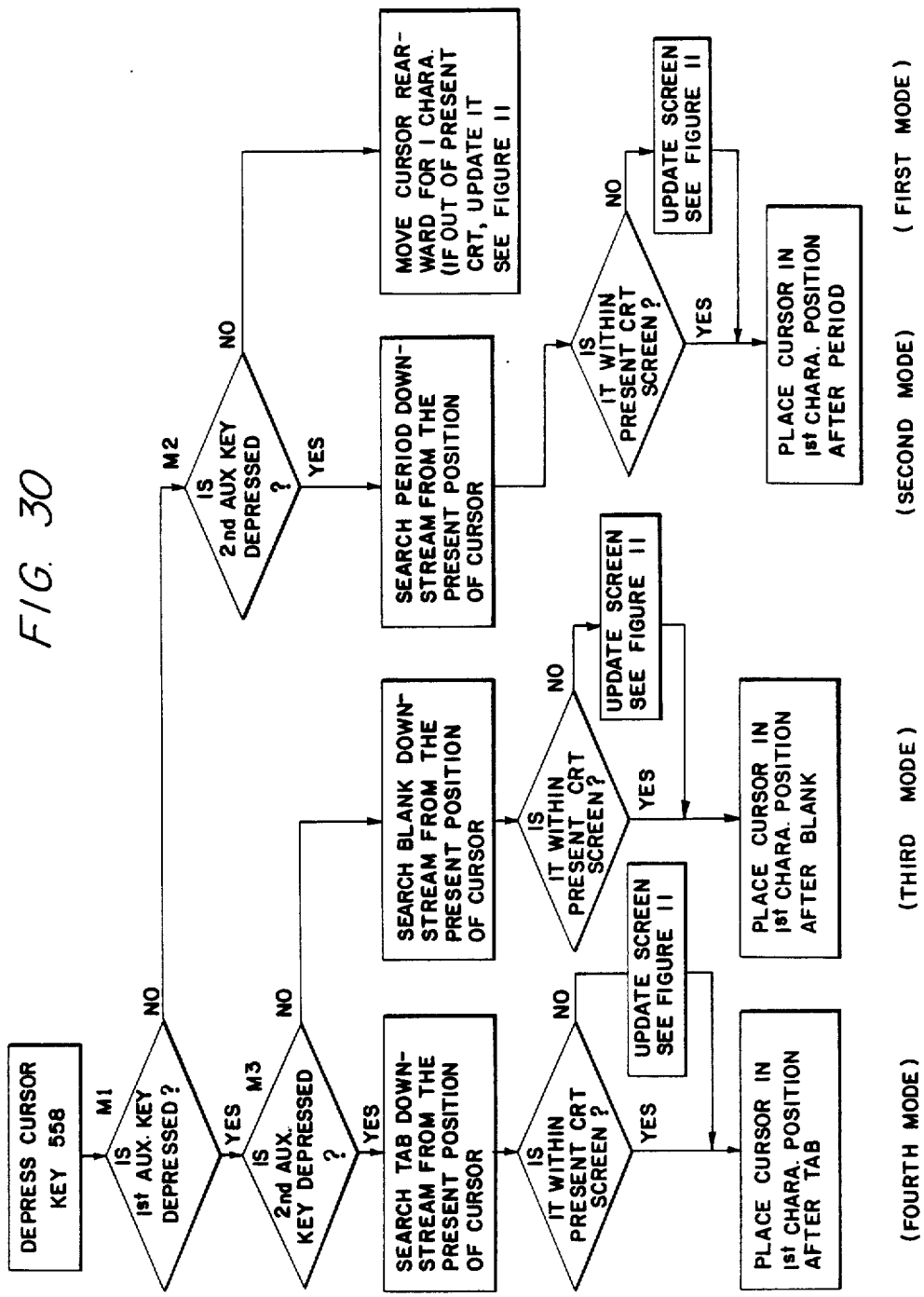
FIG. 30 is a flowchart showing the processings associated with the operation of the cursor key 558 for moving the cursor to the right.

FIGS. 27-30 show specific examples of processes which are performed in the CPU 204 in the body when the keys 550 are operated to move the cursor as shown in FIGS. 1, 3, 4 and 5. The processes illustrated in FIGS. 27-30 show the operational relations between the cursors 552, 554, 556, 558 and the two auxiliary keys 562, 564. Note that the relationship between the cursor to be moved and the display presented on the screen 102 is specifically shown in FIG. 11. FIGS. 27 and 28 show the processes related to the operation of the cursor keys 552 and 554 for moving the cursor upward and downward, respectively. FIGS. 29 and 30 show the processes related to the operation of the cursor keys 556 and 558 for moving the cursor to the left and right, respectively.

Throughout the processes shown in FIGS. 27-30, when the cursor key 552, 554, 556 or 558 is depressed, a decision is made to ascertain whether at least one of the first and second auxiliary keys 562 and 564 is depressed. If depressed, it is judged which of the two auxiliary keys is depressed or whether both keys are depressed to select the control mode for moving the cursor.

Referring specifically to FIGS. 27-30, when each cursor key is depressed, step M1 is performed to ascertain whether the first auxiliary key 562 has been depressed. If not depressed, step M2 is performed to ascertain whether the second auxiliary key 564 has been depressed. If neither auxiliary key is ascertained to be depressed, a process, referred to "the first mode" herein, will be carried out. If step M2 ascertains that only the second auxiliary key 564 has been depressed, another process, hereinafter referred to "the second mode" will be carried out. If step M1 ascertains that the first key 562 has been depressed, and if step M3 ascertains that the second key 564 has not been depressed, a further process, hereinafter referred to "the third mode" will be carried out. If steps M1 and M3 ascertain that both auxiliary keys 563 and 564 have been pressed down, a still other process, hereinafter referred to "the fourth mode" will be carried out. The first mode has already been described in connection with FIG. 11 and so the description will not be repeated below.

Referring to FIGS. 27 and 28, if the cursor keys 552 and 554 are depressed in the second mode, the cursor is moved to the initial input position (home position) and the final input position (end position) on the bottom line, respectively, on the screen 102. Then, if the cursor keys 552 and 554 are depressed in the third mode, a process is performed to search the text for a code indicating the beginning of a new page or the end of the present page, the code lying before or after the position of the present cursor. If necessary, the display presented on the screen is updated to place the cursor in the character position lying immediately after the code indicating the beginning of a new page. That is, the depression of the cursor key 552 or 554 in the third mode results in a movement of the cursor in steps of one page within the text. Further, if the cursor keys 552 and 554 are depressed in the fourth mode, the data about the initial image portion of the text and the data about the final image portion are respectively transferred to the video RAM 214 to place the cursor in the first character position and the last character position, respectively, in the text.

Referring to FIGS. 29 and 30, when the cursor keys 556 and 558 are depressed in the second mode, codes are searched for which indicate a period (.) and lie respectively before and after the present position of the cursor. If found, the cursor is moved to the character position that lies immediately after the code that indicates a period. That is, the depression of the cursor keys 556 or 558 in the second mode moves the cursor in steps of one sentence. Then, if the cursor keys 556 and 558 are depressed in the third mode, codes are searched for which indicate a blank and lie respectively before and after the present position of the cursor in the text. If found, the cursor is shifted to the position that lies immediately after the code indicating a blank. That is, depression of the cursor keys 556 or 558 in the third mode moves the cursor in steps of a word. If the cursor keys 556 and 558 are pressed down in the fourth mode, tabulations are searched for which lie respectively before land after the present position of the cursor in the text. If found, the cursor is moved to the character position lying immediately after the tabulation. That is, depression of the cursor keys 556 or 558 in the fourth mode moves the cursor in steps of a tabulation.

When the cursor key 552 or 554 is depressed in the third mode, or when the cursor key 556 or 558 is depressed in the second, third or fourth mode, if necessary, the cursor may be placed in the character position that lies immediately before the found code indicating a new page, period, blank, tabulation, or other data.

[Control Circuits]

A. Video RAM Access Control Circuit

As already described briefly with reference to the block diagram of the system shown in FIG. 2, the video RAM 214 in the body 200 acts to store image information, such as character codes and attribute codes, which is displayed on the CRT 100. The RAM 214 is accessed from the CRT controller 212 to read out information for displaying it on the CRT. Also, the RAM 214 is accessed for a read or write operation from a bus line that is controlled by the CPU 204. Since the access from the CRT controller 212 and the access from the CPU 204 take place in an asynchronous manner, collision between them should be avoided. Thus, it may be suggested that priority is given to either the CPU 204 or the controller 212 in obtaining access to the video RAM 214. However, if priority is given to the CPU 204, noise appears on the screen of the CRT, whereas if priority is given to the CRT controller 212, the throughput of the CPU 204 deteriorates. Accordingly, the word processor 10 according to the present invention employs a video RAM access control circuit 230 shown in FIG. 31 to achieve a noiseless display on the CRT without reducing the throughput of the CPU 204 considerably.

Figure 31:
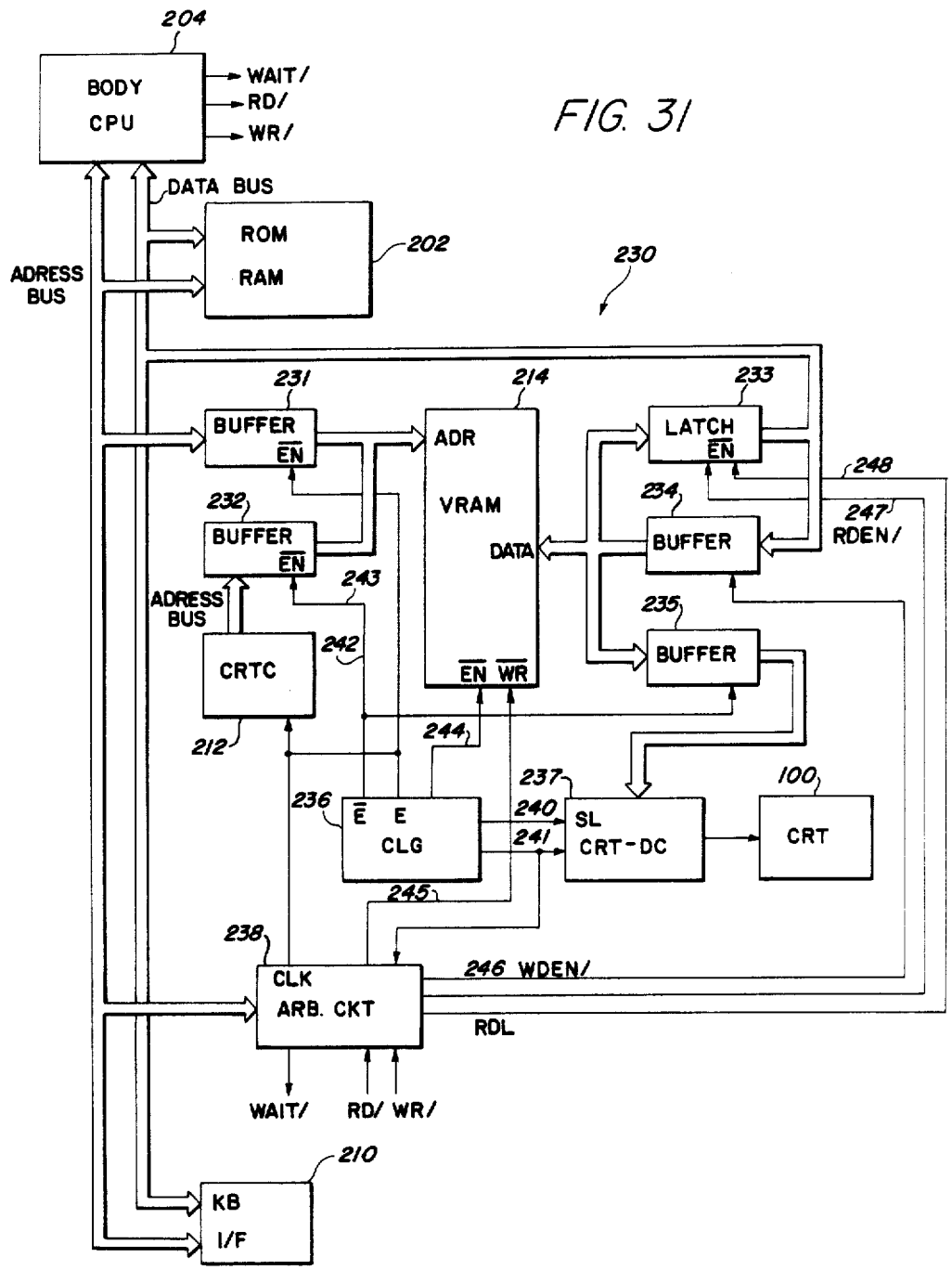
FIG. 31 is a block diagram of a video RAM access control circuit 230 incorporated in the word processor shown in FIG. 1.

The circuit of FIG. 31 is now described with reference to the timing chart of FIG. 32. The address bus to the CPU 204 is connected to the address input terminal of the video RAM 214 via a CPU address buffer 231. The address bus to the CRT controller 212 is coupled to the address input terminal of the RAM 214 via a CRT controller address buffer 232. The data bus to the CPU 204 is connected to the data input/output terminal of the video RAM 214 via an output latch 233 and an input buffer 234. The data input/output terminal of the RAM 214 is also tied to a CRT display controller (CRT-DC) 237 through another output latch 235. An image signal which is latched in the shifter of the CRT display controller 237 after being generated by the video RAM 214 cooperates with a shift synchronizing signal SI (on line 240) from a clock generator (CLG) 236 and with a dot clock signal (on line 241) to feed an image signal to the CRT 100. The generator 236 produces clock signals having a duty cycle of 50% to signal lines 242 and 243 from its output terminals E and Ē, respectively, with a period of one character display (10 dot clocks). These clock signals enable the CRT controller address buffer 232 and the CPU address buffer 231, respectively, when they assume low level (see FIG. 32). Thus, the CPU 204 and the CRT controller 212 alternately use the address bus to the video RAM 214 for every five dot clocks. The clock generator 236 has an output line 244 for delivering a RAM output enabling signal, which assumes low level for a period of 3 dot clocks after a period of 2 dot clocks has elapsed from the beginning of CRT control cycle at which the enabling clocks are in low condition, as shown in FIG. 32, to enable data to be read out of the video RAM 214.

In the structure thus far described, the CRT controller 212 has access to the video RAM 214 in the manner described below. During one CRT controller cycle where the enabling clocks are in low condition, the CRT controller address buffer 232 and the output latch 235 are enabled, so that the data about addresses is fed from the controller 212 to the RAM 214. Then, when the RAM output enabling signal on the output line 244 from the clock generator 236 becomes low, the output data is transferred through the data bus and latched in the output latch 235. Under this condition, when the shift synchronizing signal SI rises during the next CRT controller cycle on the line 240 from the clock generator 236, the data held in the latch 235 is introduced into the shifter of the CRT display controller 237. The data is then furnished to the CRT 100 as an image signal in sychronism with the dot clocks that are delivered to the output line 241 from the clock generator 236. Thus, data representing 10 dots, or one character, is read out of the video RAM for every CRT controller cycle. By repeating these operations, consecutive image signals can be obtained from the display controller 237 without causing noise on the screen.

On the other hand, a request for access which is made by the CPU 204 in response to the input from the keyboard 210, for instance, is generated in quite asynchronous relation to the aforementioned image signal. For this reason, the present control circuit 230 includes an arbitration circuit 238 to meet the request for access made by the CPU 204 in the manner described hereinafter. The arbitration circuit 238 receives an Ē-clock signal via the signal line 243 and the dot clock signal via the signal line 241 from the clock generator 236. Further, the circuit 238 receives an address bus signal, a bus memory read (BMRD) signal, and a bus memory write (BMWR) signal from the CPU 204. The arbitration circuit 238 is designed to deliver a wait signal to the CPU 204, a character write signal (CHWR) to the video RAM 214, an attribution write (ATTWR) signal to a line 245, a write data enabling (WDEN) signal through a line 246 to the video RAM input buffer 234, a read data enabling (RDEN) signal through a line 247 to the video RAM output latch 233, and a read load (RDL) signal through a line 248 to the latch 233.

Figure 32:
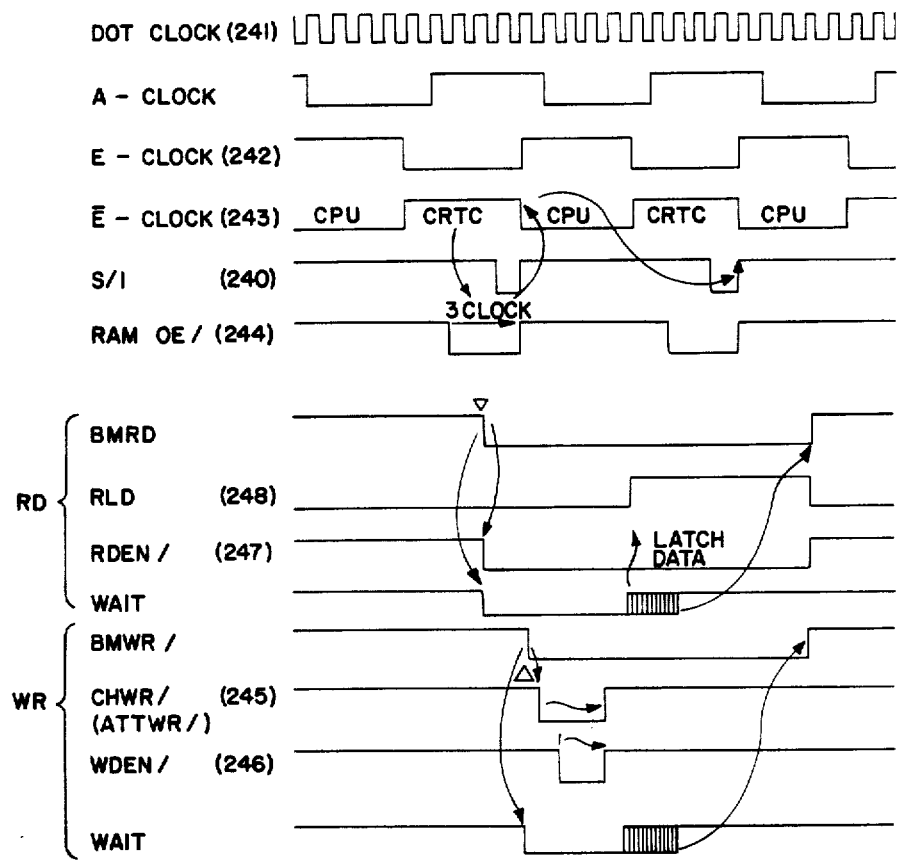
FIG. 32 is a timing chart of various waveforms generated in the circuitry of FIG. 31.

The relations among these signals are shown in FIG. 32, and they perform arbitration operations as follows. When the CPU 204 requests a read operation by the bus memory read (BMRD) signal, the arbitration circuit 238 immediately delivers the wait output at low level to bring the CPU 204 to wait state. At the same time, the circuit 238 delivers the read data enabling (RDEN) signal at low level to the line 247.

Within the arbitration circuit 238, the incoming Ē-clocks and dot clocks form A-clocks which lag the Ē-clocks by a phase difference of one dot clock. During the above-mentioned CPU cycle, a judgment is made at the trailing edge of each A-clock to ascertain whether the CPU 204 is in access condition. If so, it delivers the read load (RDL) signal at high level to the line 248 at the end of the CPU cycle to load the data that is delivered from the video RAM 214 at that time into the latch 233. Since it is in the CPU cycle, the address output from the CPU 204 is sent to the video RAM 214 via the buffer 231. Therefore, the above transfer of the data from the RAM 214 is allowed by the bus memory read (BMRD) signal from the CPU 204. As the CPU cycle terminates, the CPU is released from the wait condition. Then, after an elapse of a certain delay (recovery) time, the CPU 204 accepts the data latched in the output latch 233 and, at the same time, the bus memory read signal and the read data enabling signal which are output from it assume high level. This causes the CPU 204 to terminate the data readout from the RAM 214.

When the CPU 204 delivers the bus memory write (BMWR) signal, the arbitration circuit 238 immediately produces the wait signal in the same way as the case where the bus memory read (BMRD) signal is delivered. Under this condition, when the trailing edge of each A-clock takes place, the circuit 238 delivers the character write (CHWR) signal at low level for a certain period of 3 dot clocks. Then, after an elapse of one dot clock, it delivers the write data enabling (WDEN) signal at low level for a period of 2 dot clocks. The WDEN signal is supplied to the video RAM 214 via the line 245, thereby bringing it to the condition of data writing. Then, the WDEN signal is applied to the input buffer 234 through the line 246. Upon trailing edge of the character write (CHWR) signal or the attribution write (ATTWR) signal, the data from the CPU 204 is written into the video RAM via the buffer 234. Subsequently, as the CPU cycle terminates, the CPU is released from the wait condition. Then, after a lapse of a certain recovery time, the CPU 204 causes the bus memory write (BMWR) signal to cease, thus completing the process of the data writing.

As can be understood from the foregoing description, the provision of the arbitration circuit 238 permits the CPU 204 to effectively obtain access to the video RAM according to the cycle which is changed to another based on the image signal (dot clocks) derived from the CRT 100. In addition, no noise appears on the display presented on the screen, and the throughput is enhanced.

B. Dynamic RAM Refresh Control Circuit

A dynamic random-access memory, abbreviated D-RAM, comprises storage cells each of which consists of a transistor and a capacitor. Since it is simple in structure, the component density per chip is high. Further, it can operate at high speed and is cheap. For these and other reasons, dynamic RAMs are most extensively used among general-purpose RAMs. The RAM in the internal storage 202 in the system of FIG. 2 also utilizes this kind of device. However, the structure of the dynamic RAM requires that the storage cells be replenished by a refresh circuit every refresh cycle while some charge remains on the capacitors. A this time, a demand for access and a demand for refresh must not be made simultaneously by the CPU. In an attempt to fullfil this requirement, it has been known that the dynamic RAM is refreshed in single refresh mode, burst refresh mode, or other mode and that these conventional approaches place certain limitations on the access time taken for the CPU. Hence, there remain problems to be solved in terms of the efficiency in using the CPU.

Figure 33:
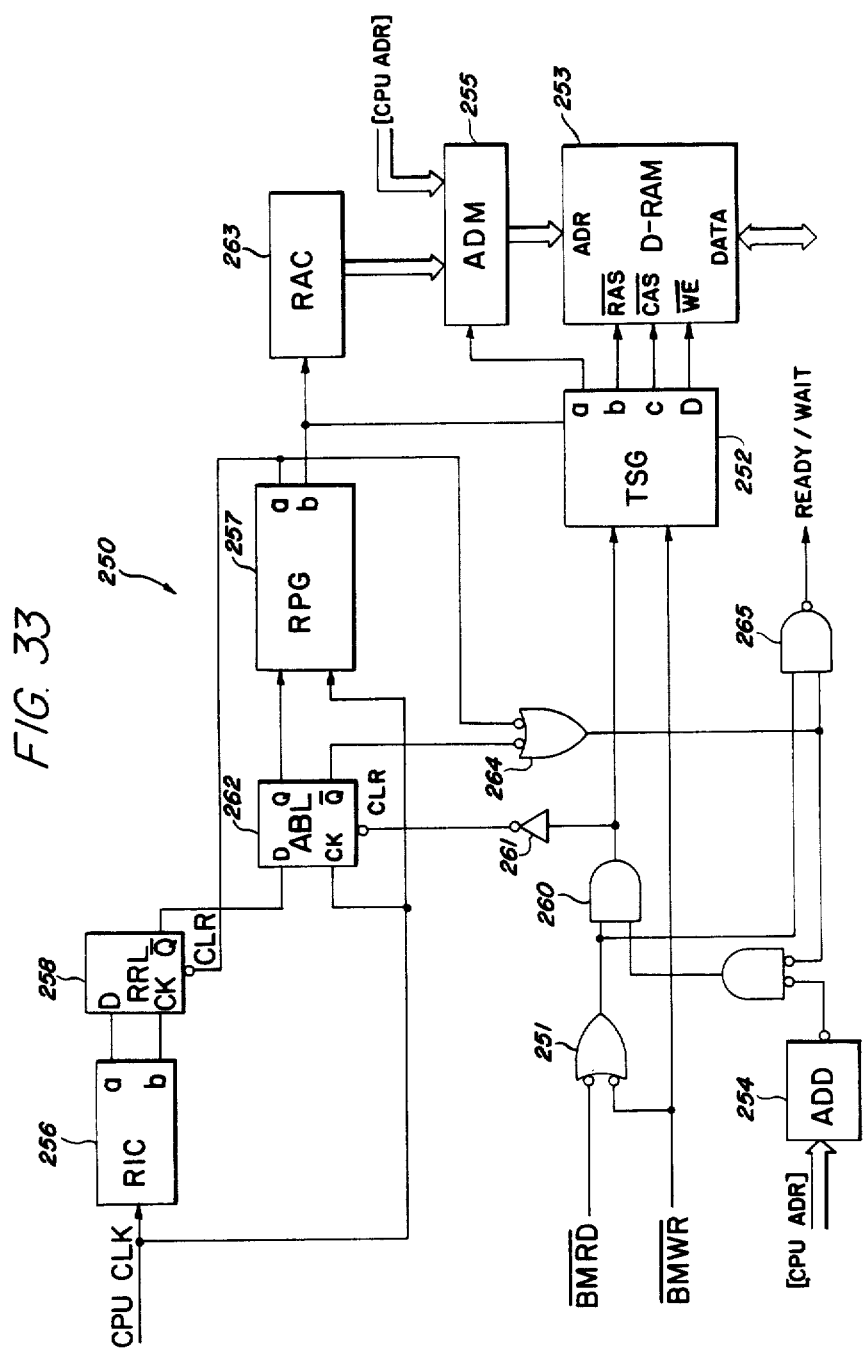
FIG. 33 is a diagram of a refresh control circuit incorporated in the word processor shown in FIG. 1.

In view of the foregoing, the refresh control circuit 250 incorporated in the novel word processor 10 has a configuration as shown in FIG. 33 to undertake the situation where a demand for access and a demand for refreshment are made in the same period by the CPU. Specifically, the control circuit allows the first coming one of the two requests to perform its operation first, while causing the later one to wait for the completion of the preceding operation, whereby minimizing the adverse effect on the access provided by the CPU.

Referring to FIG. 33, a request for access made by the CPU 204 is represented by two signals, i.e., bus read memory read (BMRD) signal and bus memory write (BMWR) signal, both of which are applied to a NOR gate 251. The signal line through which the bus read memory signal flows is also connected to a timing signal generating (TSG) circuit 252, which acts to deliver a row address strobe (RAS), a column address strobe (CAS), or other signal to the D-RAM 253 in response to the request for access to the memory made by the CPU 204, which produces an address (CPU ADR) signal applied to both an address decoder (ADD) 254 and an address multiplexer (ADM) 255. The clocks (CPU-CLK) on which the operation of the CPU 204 is based are applied to both a refresh interval counter (RIC) 256 and a refresh pulse generating (RPG) circuit 257. The output from the decoder 254 assumes low level only when the address signal from the CPU 204 specifies the D-RAM 253. The counter 256 counts the clock (CPU-CLK) and delivers a count-up signal whenever a predetermined count is obtained, in order to produce a refresh signal with a certain cycle. The refresh pulse generating circuit 257 which generates a pulse having a duration needed to refresh the dynamic RAM delivers an End of Refresh signal to reset a refresh request latch (RRL) 258 after production of the pulse.

Figure 34:
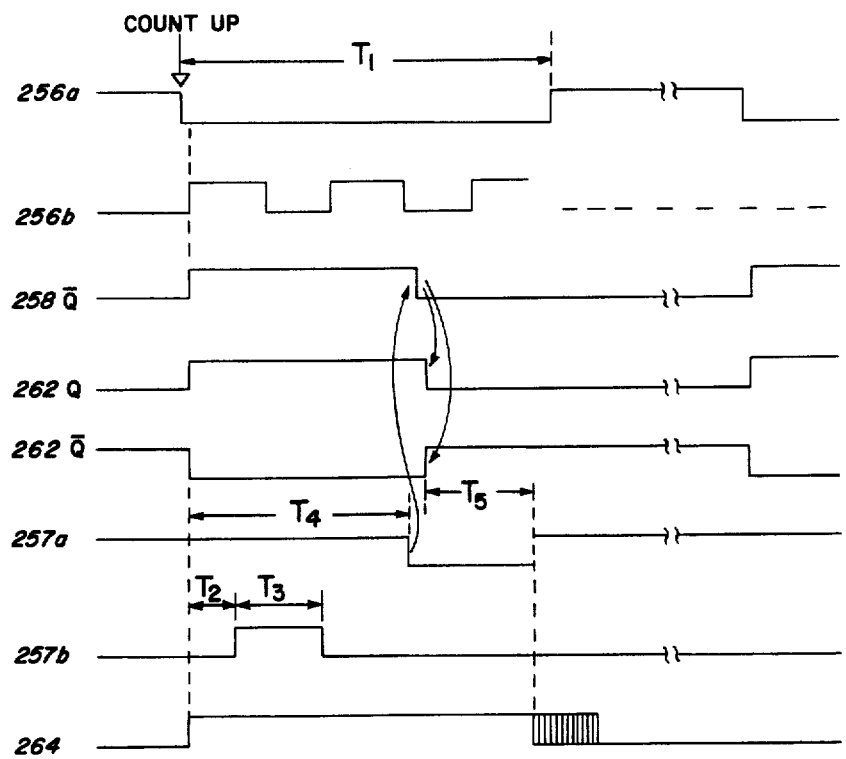
FIG. 34 is a timing chart of various waveforms generated in the refresh control circuit shown in FIG. 33.

In the structure described just above, it is now assumed that the CPU 204 delivers neither the signal requesting access, nor the bus memory read (BMRD) signal, nor the bus memory write (BMWR) signal (see FIG. 34). In this situation, $\overline{BMRD}$ signal and $\overline{BMWR}$ signal take on high level, and the output from the address decoder 254 assumes high level. Since the output from the NOR gate 251 is at low level, the output from an AND gate 260 also takes up low level, causing the output from an inverter 261 to assume high level. As a result, an arbitration latch (ABL) 262 is not cleared.

Under this condition, when the contents of the refresh interval counter 256 reach the full count, the level at an output terminal 256-a is kept at low level for a certain period of $T_1$, during which the output $\overline{Q}$ from the refresh request latch 258 is inverted, i.e., assumes high level, at the leading edge of the first clock pulse delivered from an output terminal 256-b of the counter 256. Under this condition, when the first one of the pulses (CPU-CLK) is applied to an input terminal CK of the arbitration latch 262, outputs Q and $\overline{Q}$ of the latch 262 are turned into high level and low level, respectively. Then, after a lapse of a certain period of $T_2$, a signal which assumes high level during a given time of $T_3$ is delivered from the output terminal 257-b of the refresh pulse generating (PRG) circuit 257, as shown in FIG. 34. This signal of high level causes a refresh address counter (RAC) 263 to be incremented by one, and it causes the signal (RAS) from the output terminal 252-b of the timing signal generating circuit 252 to assume high level. Then, the storge cells in the row address specified by the counter 263 are refresh. Under this condition, the output $\overline{Q}$ from the arbitration latch 262 takes on low level, causing the output from a NOR gate 264 to assume high level. This results in the output from a NAND gate 265 to be at high level. Although the CPU 204 is not brought to wait condition, when the bus memory read (BMRD) or bus memory write (BMWR) signal is delivered from it, the output from the NOR gate 251 is brought to high level, causing the output from the NAND gate 265 to assume low level. As a result, the CPU 204 is brought to wait condition. As shown in FIG. 34, after a certain period of $T_4$ has elapsed since inversion of the output Q from the latch 262, the level at the output terminal 257-a of the refresh pulse generating circuit 257 is held at low level for a certain period of $T_5$. This signal of low level resets the refresh request latch 258, causing its output $\overline{Q}$ to take on low level. Then, the output $\overline{Q}$ from the latch 262 is brought to high level. Accordingly, the termination of the low level of the pulse generating circuit 257 results in the output from the NOR gate 264 to fall to low level. The output from the NAND gate 265 then takes on high level, irrespective of the condition of the output from the NOR gate 251, permitting the CPU 204 to obtain access to the dynamic RAM.

Consequently, by setting the periods $T_4$, $T_5$ and $T_2$ taking into account the time taken for the refreshing operation as well as the time required to clear the subsequent inhibition of application of input signal, the CPU 204 is allowed to have access to the dynamic RAM immediately after the completion of the RAM. Inversely, if the CPu 204 requests access first or produces the bus memory read (BMRD), the bus memory write (BMWR) signal, or the like first, the output from the NOR gate 251 becomes high, while the output from the address decoder 254 becomes low. This causes the output from the AND gate 260 to take on high level, and causes the output from the inverter 261 to assume low level. Then, the arbitration latch 262 is cleared such that its outputs Q and $\overline{Q}$ take up low and high levels, respectively, thus making the refresh pulse generating circuit 257 inoperative. In this condition, even if the contents of the counter 256 reach its full count and if the resultant signal is latched in the refresh request latch 258, that signal is not allowed to be applied to the refresh address counter 263, whereby preventing refreshing operation. This condition continues until the request for access made by the CPU 204 is canceled, whereupon the aforementioned refresh signal can be received.

What is claimed is:

1. A word processor having
   a display device for displaying a full or partial page of information about an image, such as characters to be printed,
   a keyboard for entering the information to be displayed on the display device,
   a first storage device for storing the information displayed on the display device,
   a printer that performs its printing operation according to the information stored in the first storage device, a second storage device in which a storage medium storing a given program for word processing is detachably installed, and a control unit means including said first storage device and connected to said display device, said keyboard, said printer and said second storage device for controlling external devices including the display device, the keyboard, and the printer according to the program, said control unit comprising:

a discriminating means for ascertaining whether the storage medium is installed in the second storage device when the power supply of the word processor is put into operation; and a mode control means for selecting a type through mode in which signals are processed in response to the input from the keyboard to permit the printer to perform its printing operation in quick response to the input from the keyboard when the discriminating means has ascertained that the storage medium is not installed; and wherein, when the printer is controlled in the type through mode and the storage medium is thereafter installed in the second storage device, said control unit means causes the information which was entered by means of the keyboard in the type through mode to be stored in the second storage device in a word processing mode in which the word processor obeys the given program stored in the storage medium.

2. A word processor as set forth in claim 1, wherein said control unit further comprises a second discriminating means for ascertaining that the given program is not allowed to be read out when the power supply is put to work if the storage medium is installed in the second storage device, said mode control means acting to select the mode in which signals are processed in response to the input from the keyboard for permitting the printer to perform its printing operation in quick response to the input from the keyboard when the second discriminating means has ascertained that the given program cannot be read out.

3. A word processor as set forth in claim 1, wherein said control unit further acts to control the display device in connection with the input from the keyboard to present a display corresponding to the printing operation of the printer on the screen of the display device in response to the input from the keyboard when the keyboard is operated in type through mode in which the printer is allowed to perform its printing operation in quick response to the input from the keyboard.

4. A word processor as set forth in claim 3, wherein said control unit further acts to control either the position of paper or the position of the print head in the printer or both according to the position of the cursor on the screen of the display device when an operation is performed to move the cursor in said type through mode.

* * * * *